United States Patent
Takeda et al.

(10) Patent No.: US 9,148,881 B2
(45) Date of Patent: Sep. 29, 2015

(54) BASE STATION DEVICE, TERMINAL DEVICE, RESOURCE ALLOCATION METHOD AND RESPONSE SIGNAL TRANSMISSION METHOD

(71) Applicant: Panasonic Intellectual Property Corporation of America, Torrance, CA (US)

(72) Inventors: Kazuki Takeda, Kanagawa (JP); Ayako Horiuchi, Kanagawa (JP); Toru Oizumi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 82 days.

(21) Appl. No.: 14/342,514

(22) PCT Filed: Jun. 26, 2013

(86) PCT No.: PCT/JP2013/004001
§ 371 (c)(1),
(2) Date: Mar. 3, 2014

(87) PCT Pub. No.: WO2014/020822
PCT Pub. Date: Feb. 6, 2014

(65) Prior Publication Data
US 2014/0204897 A1    Jul. 24, 2014

(30) Foreign Application Priority Data
Aug. 2, 2012 (JP) .................................. 2012-172221

(51) Int. Cl.
H04W 72/04 (2009.01)
H04L 5/00 (2006.01)

(52) U.S. Cl.
CPC ............. *H04W 72/042* (2013.01); *H04L 5/001* (2013.01); *H04L 5/0048* (2013.01); *H04L 5/0053* (2013.01)

(58) Field of Classification Search
USPC ................................. 370/328, 329, 348, 343
See application file for complete search history.

(56) References Cited

U.S. PATENT DOCUMENTS

2010/0272091 A1* 10/2010 Fabien et al. .................. 370/345
2010/0273515 A1* 10/2010 Fabien et al. .................. 455/509
(Continued)

FOREIGN PATENT DOCUMENTS

JP    2012-104960 A    5/2012

OTHER PUBLICATIONS

3GPP TS 36.211 V10.5.0, "3rd Generation Partnership Project; Technical Specification Group Radio Access Network; Evolved Universal Terrestrial Radio Access (E-UTRA); Physical Channels and Modulation (Release 10)," Jun. 2012, 101 pages.
(Continued)

*Primary Examiner* — Andrew Lee
(74) *Attorney, Agent, or Firm* — Seed IP Law Group PLLC

(57) ABSTRACT

A base station apparatus is disclosed in which control section (150) generates an index indicating a response signal resource to be used for transmission of a response signal in response to downlink data of a plurality of CCs for at least each second CC, and transmitting section (160) transmits control information including the index. When a terminal receives the control information using only one second CC or two or more CCs among the plurality of CCs, the terminal apparatus determines the response signal resource based on the index of the second CC. Control section (150) specifies, as the response signal resource, using the index of the second CC, a first resource for transmission of a response signal in response to downlink data transmitted using only one CC or a second resource for transmission of a plurality of response signals in response to downlink data transmitted using a plurality of CCs.

11 Claims, 15 Drawing Sheets

(56) References Cited

U.S. PATENT DOCUMENTS

| | | | |
|---|---|---|---|
| 2011/0170515 A1* | 7/2011 | Kim | 370/330 |
| 2012/0039272 A1* | 2/2012 | Lee et al. | 370/329 |
| 2012/0142354 A1* | 6/2012 | Ahluwalia | 455/436 |
| 2012/0218904 A1* | 8/2012 | Narasimha et al. | 370/248 |
| 2013/0010964 A1* | 1/2013 | Fong et al. | 370/329 |
| 2013/0223297 A1* | 8/2013 | Zhang et al. | 370/280 |
| 2013/0279440 A1 | 10/2013 | Ookubo et al. | |
| 2014/0119324 A1* | 5/2014 | Lim et al. | 370/329 |
| 2014/0295909 A1* | 10/2014 | Ouchi et al. | 455/522 |

OTHER PUBLICATIONS

3GPP TS 36.212 V10.6.0, "3rd Generation Partnership Project; Technical Specification Group Radio Access Network; Evolved Universal Terrestrial Radio Access (E-UTRA); Multiplexing and channel coding (Release 10)," Jun. 2012, 79 pages.

3GPP TS 36.213 V10.6.0, "3rd Generation Partnership Project; Technical Specification Group Radio Access Network; Evolved Universal Terrestrial Radio Access (E-UTRA); Physical layer procedures (Release 10)," Jun. 2012, 125 pages.

3GPP TR 36.819 V11.1.0, "3rd Generation Partnership Project; Technical Specification Group Radio Access Network; Coordinated multi-point operation for LTE physical layer aspects (Release 11)," Dec. 2011, 69 pages.

Catt, "Resource Allocation for PUCCH Format 3," R1-105153, Agenda Item: 6.2.1.1, 3GPP TSG RAN WG1 Meeting #62bis, Xi'an, China, Oct. 11-15, 2010, 3 pages.

Ericsson, ST-Ericsson, "PUCCH Format 3 Resource Selection," R1-105313, Agenda Item: 6.2.1.1, 3GPP TSG RAN WG1 Meeting #62bis, Xi'an, China, Oct. 11-15, 2010, 5 pages.

International Search Report, dated Aug. 20, 2013, for corresponding International application No. PCT/JP2013/004001, 4 pages.

Sharp, NSN, Nokia, Pantech, Samsung, "WF on PUCCH Format 1a/1b resource allocation for ePDCCH based HARQ-ACKs," R1-123013, Agenda Item: 7.6.5, TSG-RAN WG1 Meeting #69, Prague, Czech, May 21-25, 2012, 4 pages.

* cited by examiner

US 9,148,881 B2

BASE STATION DEVICE, TERMINAL DEVICE, RESOURCE ALLOCATION METHOD AND RESPONSE SIGNAL TRANSMISSION METHOD

TECHNICAL FIELD

The present invention relates to a base station apparatus, a terminal apparatus, a resource allocation method and a response signal transmission method.

BACKGROUND ART

LTE (Long Term Evolution) Release 8 (Rel.8, or may also be referred to as "LTE") defined in 3GPP (3rd Generation Partnership Project) and LTE Release 10 (Rel.10, or may also be referred to as "LTE-Advanced") which is an enhanced version thereof introduce HARQ (hybrid automatic repeat request) which combines error correcting coding and automatic retransmission request (e.g., see NPLs 1, 2 and 3).

When HARQ is applied to transmission/reception of downlink data, a terminal performs error correcting decoding on downlink data transmitted from a base station, and then determines whether or not the data has been correctly decoded based on a CRC (cyclic redundancy checksum) added to the data. The terminal feeds back a response signal indicating an ACK (decoding success) or NACK (decoding failure) (hereinafter, referred to as "A/N signal") to the base station based on the determination result. Upon receiving a NACK, the base station retransmits data in which an error has been detected.

An uplink channel such as PUCCH (physical uplink control channel) or PUSCH (physical uplink shared channel) is used to feed back such an A/N signal. Which channel is used to transmit an A/N signal or when an A/N signal is transmitted using PUCCH, which of a plurality of formats (PUCCH formats) is used to transmit the A/N signal is determined based on, for example, the presence or absence of uplink data when the A/N signal is transmitted, the presence or absence of CSI (channel state information), the presence or absence of a configuration of CA (carrier aggregation) or the like (e.g., see NPL 3). For example, when only an A/N signal is transmitted or when only a scheduling request for uplink data and an A/N signal are transmitted, PUCCH formats 1a/1b are used.

PUCCH formats 1a/1b are an uplink control signal format (most robust format) that can code-division-multiplex (CDM: code division multiplexing) 12, 18 or 36 A/N signals per frequency resource block (RB) and transmit/receive the A/N signals with the lowest required quality (required SINR (signal to interference and noise ratio)) (e.g., see NPL 1). PUCCH formats 1a/1b can simultaneously feed back A/N signals of 1 or 2 bits. For spreading for code-division-multiplexing in PUCCH formats 1a/1b, a ZAC (Zero auto-correlation) sequence having a sequence length of 12 is used for primary spreading, and a Walsh sequence having a sequence length of 4 and a DFT (discrete Fourier transform) sequence having a sequence length of 3 are used for secondary spreading. A/N signals transmitted by different terminals can be multiplexed by giving different cyclic shifts to a ZAC sequence in primary spreading or by multiplying the A/N signals by respective components of different orthogonal code sequences in secondary spreading. Note that an orthogonal code sequence is a combination of a Walsh sequence and a DFT sequence. The orthogonal code sequence may also be referred to as "block-wise spreading code." In the following description, one PUCCH formats 1a/1b resource determined by an RB, a primary spread cyclic shift and a secondary spread orthogonal code sequence is referred to as "A/N resource" or "PUCCH resource."

In order to code-division-multiplex A/N signals transmitted by a plurality of different terminals, different A/N resources need to be allocated to the respective terminals. In LTE and LTE-Advanced, control information of each terminal is always mapped to different PDCCH resources in PDCCH (physical downlink control channel) which is a downlink control channel. Focusing attention on this, LTE and LTE-Advanced prescribe that A/N resource numbers should be uniquely determined according to PDCCH resource numbers to which downlink control information is mapped. More specifically, A/N resource number $n_{PUCCH}$ is determined based on following equation 1 (e.g., see NPL 1).

[1]

$$n_{PUCCH} = N_{PUCCH}^{(1)} + n_{CCE} \quad \text{(Equation 1)}$$

In equation 1, A/N resource number $n_{PUCCH}$ is a value determined by an RB number and a spreading code number. Furthermore, $N_{PUCCH}^{(1)}$ represents a constant commonly indicated to all terminals in a cell and $n_{CCE}$ represents a first (beginning) PDCCH resource (CCE) number among PDCCH resources to which control information of the terminals is mapped. More specifically, $n_{CCE}$ is given as a number (CCE index) of CCE (control channel element) defined as a resource unit of PDCCH.

The method of uniquely defining an A/N resource number using a PDCCH resource number is called an "implicit A/N resource allocation method" in the sense that it does not explicitly specify an A/N resource."

FIGS. 1A and 1B illustrate a downlink subframe (FIG. 1A) made up of PDCCH and PDSCH (physical downlink shared channel), and uplink PUCCH resources (FIG. 1B). FIG. 1A illustrates allocation of data (PDSCH) to a plurality of terminals a to d and allocation of PDCCH including control information (e.g., allocation information) corresponding to each piece of data. On the other hand, FIG. 1B illustrates A/N resources (A/N resources in PUCCH formats 1a/1b) uniquely determined by the PDCCH resources shown in FIG. 1A. In FIG. 1B, the horizontal axis shows an RB number (UL RB index) in the uplink and the vertical axis shows a code number (PUCCH code index) in a PUCCH RB.

For example, as shown in FIG. 1B, mutually different A/N resources are associated, in a one-to-one correspondence, with respective PDCCH resources to which control information intended for terminals a to d shown in FIG. 1A is assigned. When PDSCH is allocated to the plurality of terminals a to d as shown in FIG. 1A, PDCCH resources indicating allocation information of the respective PDSCHs do not overlap with each other. That is, $n_{CCE}$ shown in equation 1 differs from one terminal to another. Thus, as shown in FIG. 1B, A/N resources ($n_{PUCCH}$) defined in equation 1 do not overlap among the terminals either. For example, in FIG. 1B, terminal a and terminal b or terminal c and terminal d are code-division-multiplexed with the same RB respectively, and terminals a and b, and terminals c and d are frequency-division-multiplexed. Simultaneous transmission of A/N signals by different terminals is thereby made possible through code-division-multiplexing or frequency-division-multiplexing.

Aforementioned CA is a technique introduced in LTE-Advanced which enables high-speed data transmission by assigning a plurality of frequency bands (CC: component carrier) which are basic units of a communication band to one terminal. In CA, a plurality of CCs set for one terminal is made up of one PCell (primary cell) and one or a plurality of SCells (secondary cells). PCell is a CC that transmits an A/N signal, for example, when A/N signals in response to downlink data of a plurality of CCs are transmitted using only one A/N signal. Alternatively, PCell is a CC that transmits broadcast information relating to a CC that transmits A/N signals. Moreover, among a plurality of CCs set for a terminal, CCs other than PCell are SCells.

When CA is configured, since a plurality of pieces of downlink data are simultaneously transmitted, a single terminal needs to simultaneously feed back a plurality of A/N signals corresponding to a plurality of respective pieces of downlink data. To realize this feedback of A/N signals, LTE-Advanced adopts PUCCH format 1b with channel selection that can simultaneously feed back A/N signals of up to 4 bits and PUCCH format 3 that can simultaneously feed back A/N signals of 10 bits or more (e.g., see NPLs 1 and 3). When CA is configured, one of PUCCH format 1b with channel selection and PUCCH format 3 is configured in the terminal.

PUCCH format 1b with channel selection is a format that supports a method of expressing an A/N signal of a maximum of 4 bits in one symbol using a plurality of A/N resources of PUCCH formats 1a/1b and a QPSK constellation. More specifically, 4-bit A/N signals can be simultaneously transmitted using a maximum of four A/N resources and QPSK constellation (4 constellation points) of each A/N resource. For example, PUCCH format 1b with channel selection is used when two CCs are configured for a terminal.

PUCCH format 3 is a new PUCCH format whose spreading method is different from other formats. More specifically, PUCCH format 3 is a format that supports a method of increasing the number of transmittable bits per terminal by performing only spreading by an orthogonal code sequence corresponding to secondary spreading without using a ZAC sequence such as PUCCH formats 1a/1b. In the following description, a resource of one PUCCH format 3 defined by an RB and an orthogonal code sequence is called "A/N resource."

When CA is configured, LTE-Advanced introduces ARI (ACK/NACK resource indicator) which is control information for indicating assignment of SCell to realize more flexible A/N resource allocation. The ARI is indicated by PDCCH and is information of, for example, 2 bits. FIG. 2 illustrates an example of use of ARIs when CA using three CCs (PCell, SCell1, SCell2) is configured. In FIG. 2, control information (PDCCH) relating to downlink data (PDSCH) of each CC is transmitted individually. Furthermore, ARIs are only included in control information of SCells. When downlink data is assigned to three CCs respectively, the base station specifies A/N resources of PUCCH format 3 using ARIs included in control information of two SCells out of respective pieces of control information of the three CCs.

In FIG. 2, A/N resource numbers (F3(1) to (4)) of four PUCCH format 3 A/N resources are previously indicated from a base station to a terminal through RRC control information or the like. The base station specifies, using ARIs, which A/N resource is used for the terminal among previously indicated A/N resources. However, ARIs included in control information of two different CCs (SCells) specify an identical A/N resource number. In FIG. 2, upon receiving control information corresponding to three CCs, the terminal feeds back A/N signals for downlink data (PDSCH) corresponding to the respective CCs using A/N resources of PUCCH format 3 specified by the ARIs.

Note that the terminal may not be able to detect part or whole control information transmitted from the base station. When the terminal has not been able to detect the control information of PCell, the terminal feeds back A/N signals using A/N resources of PUCCH format 3 specified by the ARI of SCell. On the other hand, when the terminal has not been able to detect control information of SCell, the terminal feeds back A/N signals using A/N resources when CA is not configured, that is, using an A/N resource (F1a/1b(1) shown in FIG. 2) of PUCCH formats 1a/1b determined by the CCE index used for transmission of control information of PCell according to equation 1.

A case has been described so far where A/N signals of a plurality of CCs are fed back in PUCCH format 3 as an example. However, even when the number of CCs configured for the terminal is 2 and PUCCH format 1b with channel selection is applied, A/N resources are selected using an ARI in the same way as shown above.

Furthermore, LTE Release 11 (Rel.11, which may also be referred to as LTE-Advanced as in the case of Rel.10) is studying to adopt ePDCCH (enhanced PDCCH) arranged in PDSCH as a new control channel different from PDCCH (e.g., see NPL 4). Unlike PDCCH transmitted by resources common to all terminals in a cell, ePDCCH is allocated to an RB indicated for each terminal FIG. 3 illustrates an example of operation of allocating downlink data (PDSCH) using PDCCH or ePDCCH. In FIG. 3, control information intended for terminals a to d is transmitted using PDCCH and control information intended for terminals e to g is transmitted using ePDCCH.

CITATION LIST

Non-Patent Literature

NPL 1
3GPP TS 36.211 V10.5.0, "Physical Channels and Modulation (Release 10)," June. 2012
NPL 2
3GPP TS 36.212 V10.6.0, "Multiplexing and channel coding (Release 10)," June. 2012
NPL 3
3GPP TS 36.213 V10.6.0, "Physical layer procedures (Release 10)," June. 2012
NPL 4
3GPP TR36.819, "Coordinated multi-point operation for LTE physical layer aspects," Sharp, December 2011.
NPL 5
3GPP RAN1#69, R1-123013, "WF on PUCCH Format 1a/1b resource allocation for ePDCCH based HARQ-ACKs," Sharp, Nokia, NSN, Pantech, Samsung, May 2012.

SUMMARY OF INVENTION

Technical Problem

The A/N resource allocation method for a terminal using PDCCH (hereinafter referred to as "PDCCH terminal") is defined as described above, whereas the A/N resource allocation method for a terminal using ePDCCH (hereinafter referred to as "ePDCCH terminal") is not defined.

For example, as the A/N resource allocation method for ePDCCH terminals, A/N resources may be implicitly determined based on equation 1 as in the case of PDCCH. However, since PDCCH is not used for ePDCCH terminals, this method needs to use an index (eCCE index) of eCCE (enhanced CCE) which is an allocation resource unit of ePDCCH, an index (eREG index) of eREG (enhanced resource element group) or an RB index of PDSCH to which downlink data is allocated or the like, instead of a CCE index for ePDCCH terminals. Note that eREG is a resource unit smaller than eCCE.

However, since A/N resources are implicitly determined based on different standards (that is, mutually independent resource numbers of downlink control channels) between ePDCCH terminals and PDCCH terminals in this method, A/N resources allocated to the respective terminals may collide with each other. In contrast, if A/N resources used by an ePDCCH terminal and a PDCCH terminal are configured in different RBs, it is possible to avoid collision of A/N resources between the ePDCCH terminal and the PDCCH terminal. However, configuring different A/N resources between PDCCH and ePDCCH may cause the uplink data region (PUSCH band) to decrease, which is not desirable from the viewpoint of uplink throughput.

Considering the circumstances mentioned above, a method is being studied as another A/N resource allocation method, which includes an ARI in control information transmitted using ePDCCH even when CA is not configured (NPL 5). In this method, the ARI is used to prevent collision between A/N resources used by an ePDCCH terminal and A/N resources used by a PDCCH terminal. More specifically, a base station determines whether or not collision in implicitly determined A/N resources occurs between the ePDCCH terminal and the PDCCH terminal before transmission of control information and at a time when allocation of control information to the respective PDCCH and ePDCCH terminals has completed. Upon determining that a plurality of A/N resources collide, the base station specifies resources different from A/N resources implicitly determined by an eCCE index using an ARI included in control information intended for the ePDCCH terminal. Thus, the base station can prevent collision of a plurality of A/N resources, specify A/N resources and reduce a probability of collision of A/N resources.

Thus, when an ARI is used for A/N resource allocation to the ePDCCH terminal, if CA is configured, an ARI is also included in control information of PCell in addition to the control information of SCell. If CA operation equivalent to that in Rel.10 is adopted in Rel.11, use of ARIs as shown below can be considered.

As shown in FIG. 4, an ARI included in control information of PCell is used to specify one resource from among four different A/N resources (F1a/1b(1) to F1a/1b(4)) of PUCCH formats 1a/1b. On the other hand, an ARI included in control information of SCell is used in the same way as in the case of Rel.10. That is, as shown in FIG. 4 (or FIG. 2), when CA using three CCs is configured, an ARI included in control information of SCell is used to specify one resource from among four different A/N resources (F3(1) to F3(4)) of PUCCH format 3.

However, though CA is configured, at timing at which the amount of allocated downlink data is small and data is allocated to only one CC, it is difficult to allocate data to only SCell. This is because in the CA configuration, if the base station allocates data to only one SCell, an A/N signal in response to the data is always fed back using an A/N resource of PUCCH format 3 determined by a specification of an ARI included in the control information of the SCell (e.g., see FIG. 4). Here, both the required quality and the number of terminals that can be multiplexed differ between PUCCH formats 1a/1b and PUCCH format 3. More specifically, while the number of terminals that can be multiplexed is small in PUCCH format 3 compared to PUCCH formats 1a/1b, more A/N signals can be simultaneously transmitted using large capacity A/N resources. That is, even when downlink data is allocated to only SCell and the number of A/N signals is small, the terminal needs to feed back the A/N signals using large capacity resources. Thus, in the above method, resource utilization efficiency of the uplink decreases.

An object of the present invention is to provide a base station apparatus, a terminal apparatus, a resource allocation method and a response signal transmission method capable of improving resource utilization efficiency of an uplink even when downlink data is allocated using ePDCCHs of a plurality of CCs.

Solution to Problem

A base station apparatus according to an aspect of the invention is configured to transmit downlink data to a terminal apparatus using a plurality of component carriers (CCs) including one first CC and one or a plurality of second CCs, the base station apparatus including: a control section that generates an index indicating a response signal resource to be used for transmission of a response signal in response to the downlink data of the plurality of CCs for at least each of the second CCs; and a transmitting section that transmits control information including the index, in which: when the terminal apparatus receives the control information using only one second CC or two or more CCs among the plurality of CCs, the terminal apparatus determines the response signal resource based on the index of the second CC; and the control section specifies a first resource or a second resource as the response signal resource using the index of the second CC, the first resource being a resource for transmission of a response signal in response to downlink data transmitted using only one CC, the second resource being a resource for transmission of a plurality of response signals in response to downlink data transmitted using a plurality of CCs.

A terminal apparatus according to an aspect of the present invention includes: a receiving section that receives downlink data and control information transmitted from a base station apparatus using a plurality of component carriers (CCs) including one first CC and one or a plurality of second CCs; a control section that determines, when the control information is received using only one second CC or two or more CCs among the plurality of CCs, a response signal resource to be used for transmission of a response signal in response to downlink data based on an index included in the control information of the second CC; and a transmitting section that transmits the response signal using the determined response signal resource, in which the response signal resource determined based on the index of the second CC is a first resource for transmission of a response signal in response to downlink data transmitted using only one CC or a second resource for transmission of a plurality of response signals in response to downlink data transmitted using a plurality of CCs.

A resource allocation method according to an aspect of the present invention is a method for a base station apparatus that transmits downlink data to a terminal apparatus using a plurality of component carriers (CCs) including one first CC and one or a plurality of second CCs, the method including: generating an index indicating a response signal resource to be used for transmission of a response signal in response to the downlink data of the plurality of CCs for at least each of the second CCs; transmitting control information including the index; determining by the terminal apparatus, when the terminal apparatus receives the control information using only one second CC or two or more CCs among the plurality of CCs, the response signal resource based on the index of the second CC; and specifying a first resource or a second resource using the index of the second CC as the response signal resource, the first resource being a resource for transmission of a response signal in response to downlink data transmitted by only one CC, the second resource being a resource for transmission of a plurality of response signals in response to downlink data transmitted using a plurality of CCs.

A response signal transmission method according to an aspect of the present invention is a method including: receiving downlink data and control information transmitted from a base station apparatus using a plurality of component carriers (CCs) including one first CC and one or a plurality of second CCs; determining, when the control information is received using only one second CC or two or more CCs among the plurality of CCs, a response signal resource to be used for transmission of a response signal in response to downlink data based on an index included in the control information of the second CC; and transmitting the response signal using the determined response signal resource, in which the response signal resource determined based on the index of the second CC is a first resource for transmission of a response signal in response to downlink data transmitted using only one CC or a second resource for transmission of a plurality of response signals in response to downlink data transmitted using a plurality of CCs.

Advantageous Effects of Invention

According to the present invention, the uplink resource utilization efficiency can be improved even when downlink data is allocated using ePDCCHs of a plurality of CCs.

DESCRIPTION OF EMBODIMENTS

Figure 1B:
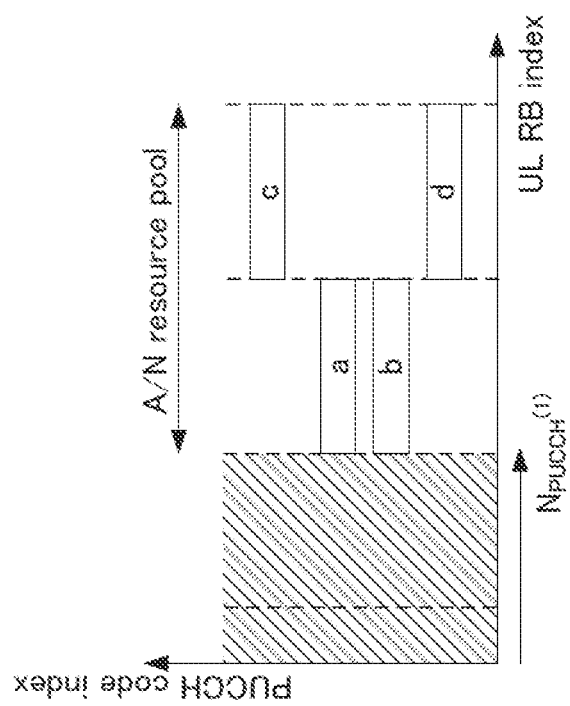
FIGS. 1A and 1B illustrate an example of A/N resource allocation to PDSCH scheduled using PDCCH.
Figure 1A:
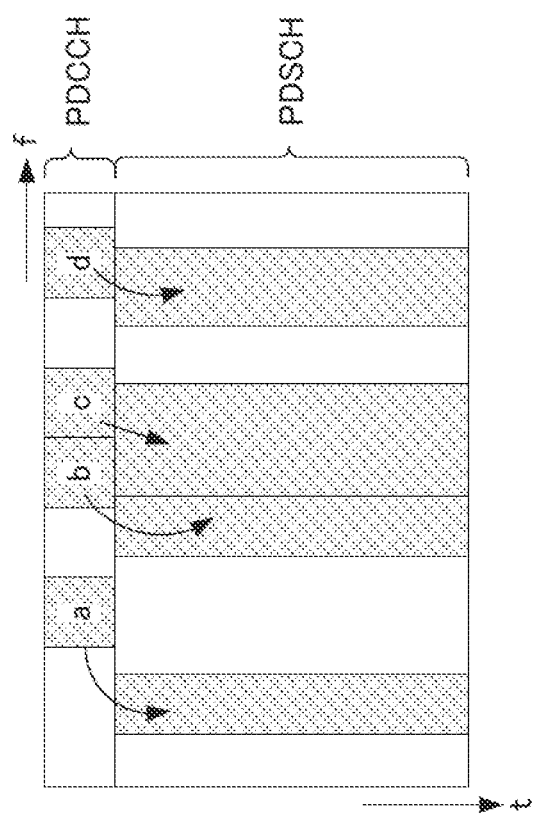

Hereinafter, embodiments of the present invention will be described in detail with reference to the accompanying drawings. Note that identical components among the embodiments will be assigned the same reference numerals and duplicate description thereof will be omitted.

Embodiment 1

[Overview of Communication System]

Figure 5:
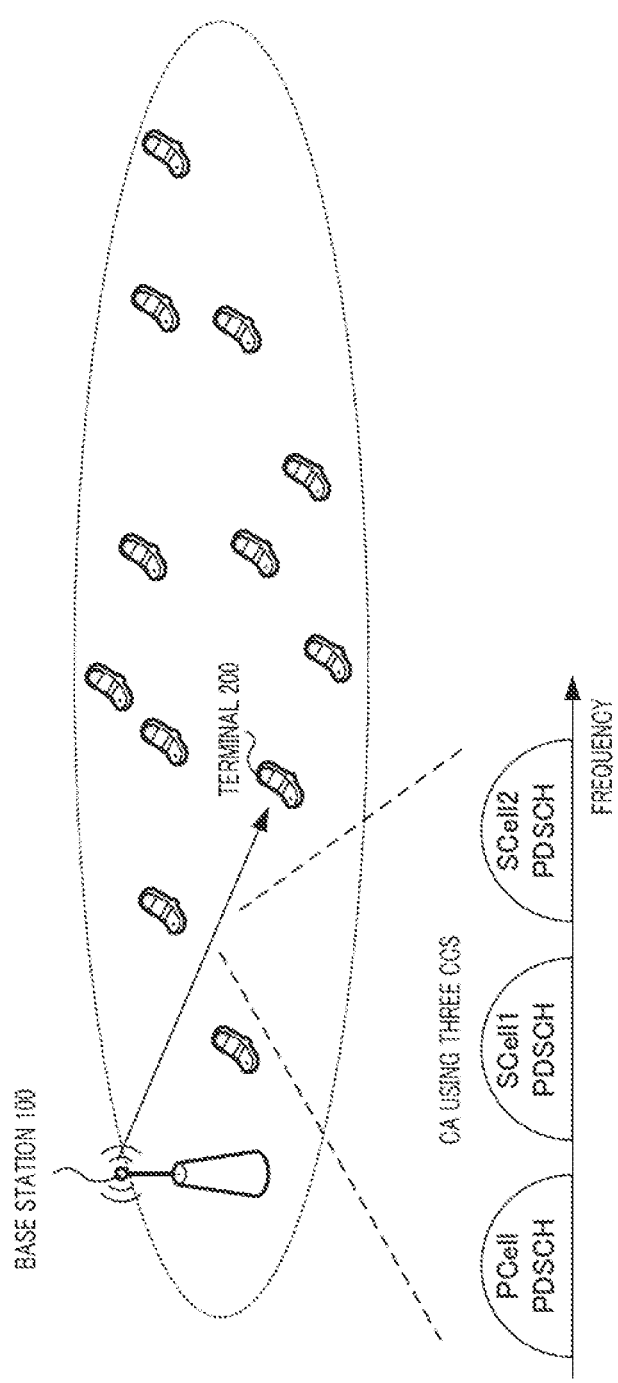
FIG. 5 illustrates a communication system according to Embodiment 1 of the present invention.

FIG. 5 illustrates a communication system according to the present embodiment. The communication system shown in FIG. 5 is constructed of one base station 100 and a plurality of terminals 200 in a cell. CA using a plurality of CCs is configured for some or all terminals 200. In FIG. 5, CA using three CCs (PCell, SCell1, SCell2) is configured for target terminals 200. In FIG. 5, although only one base station 100 is installed in the cell, system operation such as a HetNet (heterogeneous network) or CoMP (coordinated multipoint) in which pico-base stations or RRHs (remote radio head) connected via a large capacity backhaul such as an optical fiber are distributed may also be adopted.

[Configuration of Base Station]

Figure 6:
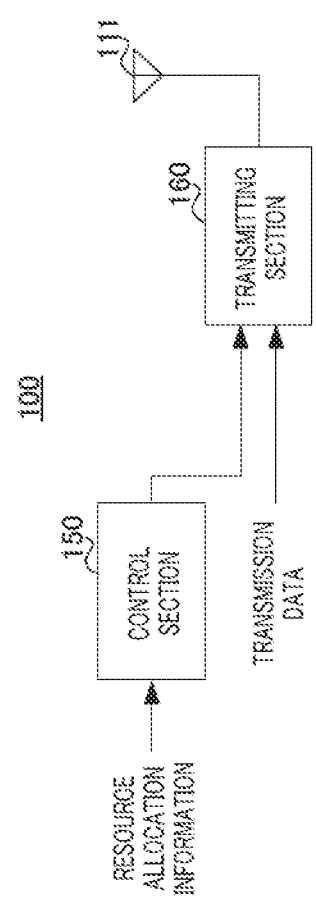
FIG. 6 is a block diagram illustrating main components of a base station according to Embodiment 1 of the present invention.

FIG. 6 is a block diagram illustrating main components of base station 100 according to the present embodiment.

Base station 100 shown in FIG. 6 transmits downlink data to terminal 200 using each of a plurality of CCs including one first CC (PCell), and one or a plurality of second CCs (SCells). In FIG. 6, control section 150 generates an index (ARI) indicating a response signal resource used for transmission of an A/N signal in response to downlink data of a plurality of CCs at least for each second CC (SCell). Here, when terminal 200 receives control information using only one second CC among a plurality of CCs, terminal 200 determines a response signal resource based on an ARI of one second CC. Using the ARI of the second CCs, control section 150 specifies a first resource for A/N signal transmission in response to downlink data transmitted using only a single CC or second resources for transmission of a plurality of A/N signals in response to downlink data transmitted using each of the plurality of CCs as response signal resources.

More specifically, control section 150 generates control information of each terminal 200 from resource allocation information or the like of a downlink. Control information of each terminal 200 is allocated to PDCCH or ePDCCH in one or a plurality of CCs. Control information of SCell includes an ARI even it is transmitted using one of PDCCH and ePDCCH. On the other hand, control information of PCell includes no ARI when it is transmitted using PDCCH, whereas the control information of PCell includes an ARI when it is transmitted using ePDCCH. For terminal 200 for which downlink data is allocated to SCell, control section 150 specifies a PUCCH format and an A/N resource number for transmitting an A/N signal to terminal 200 using an ARI included in control information of SCell. Here, PUCCH format and A/N resource number candidates specified by the ARI are previously indicated from base station 100 to terminal 200 using an RRC control signal or the like. Control section 150 determines an ARI value so that the A/N resource determined as described above does not collide with A/N resources of other terminals 200, generates control information including this ARI and outputs the control information to transmitting section 160.

Transmitting section 160 transmits the control information including the ARI (index). More specifically, transmitting section 160 transmits, by radio, a signal of each channel including transmission data (downlink data) assigned to one or a plurality of CCs and control information. That is, transmitting section 160 transmits transmission data of one or a plurality of CCs using PDSCH and transmits control information of one or a plurality of CCs using PDCCH and ePDCCH respectively.

Figure 7:
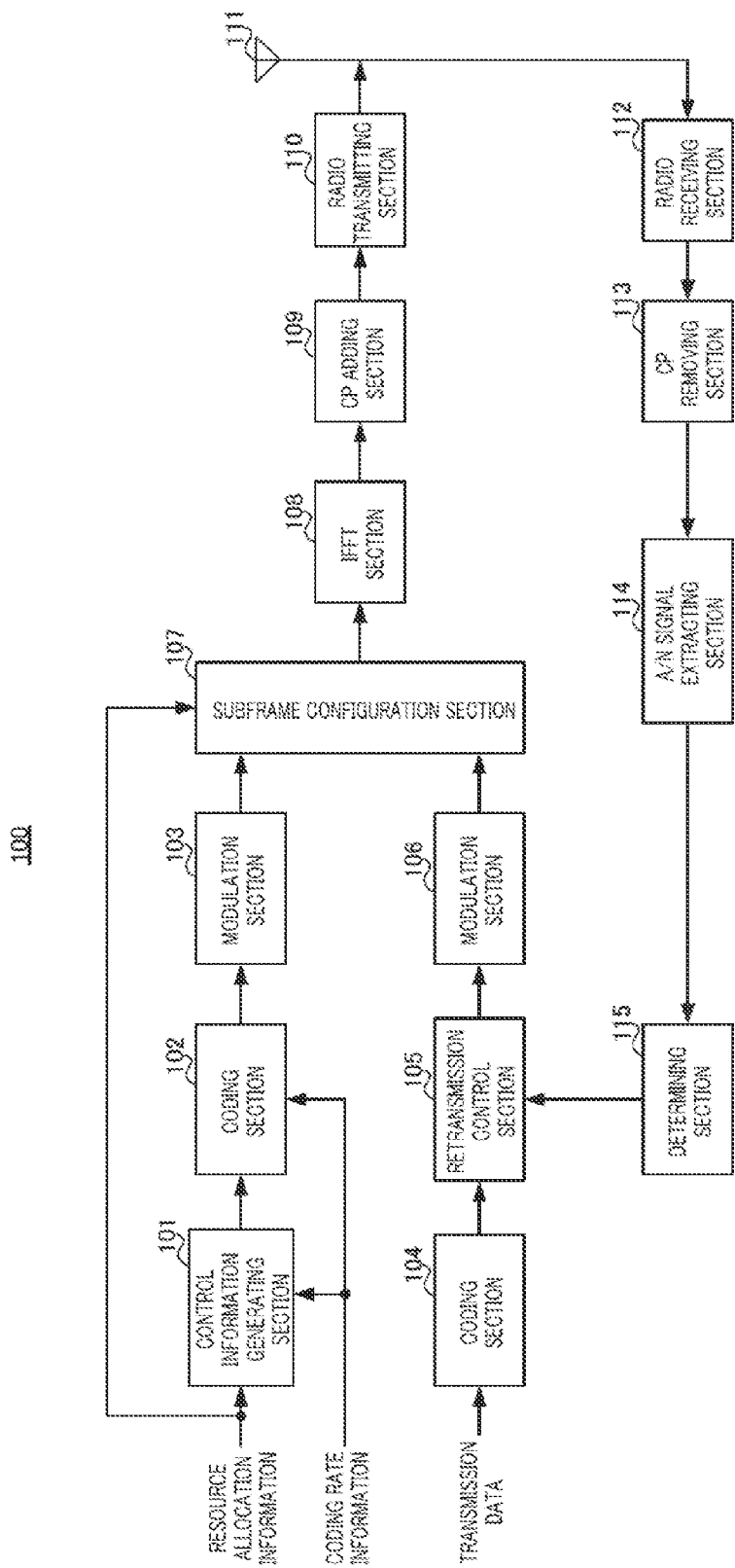
FIG. 7 is a block diagram illustrating a configuration of the base station according to Embodiment 1 of the present invention.

FIG. 7 is a block diagram illustrating a configuration of base station 100 according to the present embodiment.

In FIG. 7, base station 100 includes control information generating section 101, coding section 102, modulation section 103, coding section 104, retransmission control section 105, modulation section 106, subframe configuration section 107, IFFT (Inverse Fast Fourier Transform) section 108, CP (Cyclic Prefix) adding section 109, radio transmitting section 110, antenna 111, radio receiving section 112, CP removing section 113, A/N signal extracting section 114, and determining section 115.

Among these sections, control information generating section 101 mainly functions as control section 150, and the configuration from coding section 102 to radio transmitting section 110 and from coding section 104 to radio transmitting section 110 mainly functions as transmitting section 160.

Base station 100 transmits downlink control information (PDCCH, ePDCCH) and downlink data (PDSCH) using one or a plurality of CCs in the downlink. Base station 100 receives uplink control information (PUCCH) and detects A/N signals fed back from terminal 200. Note that in order to avoid the description from becoming complicated, components associated with transmission of PDCCH, ePDCCH and PDSCH in the downlink and reception of PUCCH (A/N signals) in the uplink closely related to the present invention will be described, and illustration and description of components associated with reception of uplink data will be omitted.

Control information generating section 101 generates control information including resource allocation information indicating resource allocation results for each terminal 200 to which downlink data is allocated and coding rate information for each terminal 200. Control information generating section 101 outputs the generated control information for each terminal 200 to coding section 102. This control information is generated for each CC. The control information for each terminal 200 includes terminal ID information indicating for which terminal the control information is intended. For example, the control information includes a CRC bit masked with an ID number of a terminal to which the control information is indicated as the terminal ID information.

Information included in the control information differs depending on whether the control information is transmitted using PDCCH or ePDCCH. The control information transmitted using ePDCCH includes an ARI that specifies an A/N resource used by terminal 200 to feed back an A/N signal regardless of the number of CCs or whether the control information relates to which CC: PCell or SCell. On the other hand, of the control information transmitted using PDCCH, control information of SCell includes an ARI, whereas control information of PCell includes no ARI. The ARI is, for example, 2-bit information and the ARI specifies the type of PUCCH format and A/N resources used by target terminal 200 for transmission of A/N signals. Note that candidates for a PUCCH format and candidates for A/N resources specifiable by the ARI are previously indicated from base station 100 to terminal 200 using RRC control information or the like.

Coding section 102 encodes control information for each terminal 200 independently of each other. Coding may be identical or different between control information mapped to PDCCH and control information mapped to ePDCCH. Coding section 102 outputs the encoded control information to modulation section 103.

Modulation section 103 modulates the control information for each terminal 200 independently of each other. Modulation may be identical or different between control information mapped to PDCCH and control information mapped to ePDCCH. Modulation section 103 outputs the modulated control information to subframe configuration section 107.

Coding section 104 adds a CRC bit masked based on an ID of each terminal 200 to a data bit sequence to be transmitted to each terminal 200 (transmission data, that is, downlink data) and applies error correcting coding. Coding section 104 outputs the encoded transmission data to retransmission control section 105.

Retransmission control section 105 stores transmission data for each terminal 200 and outputs the transmission data to modulation section 106 at initial transmission. On the other hand, upon receiving a signal prompting retransmission from determining section 115 (which will be described later), retransmission control section 105 outputs, to modulation section 106, transmission data (stored data) corresponding to the retransmission for terminal 200 corresponding to the NACK signal, that is, terminal 200 for which retransmission is carried out. Upon receiving a signal prompting transmission of the next transmission data from determining section 115, retransmission control section 105 discards the transmission data (stored data) intended for terminal 200 corresponding to the ACK signal.

Modulation section 106 modulates the transmission data for each terminal 200 and outputs the modulated transmission data to subframe configuration section 107.

Subframe configuration section 107 allocates the control information received from modulation section 103 and the transmission data received from modulation section 106 to resources indicated in inputted resource allocation information (e.g., resources divided in the corresponding time domain and frequency domain in subframes of a plurality of CCs). Thus, subframe configuration section 107 configures a downlink subframe in each CC. Subframe configuration section 107 outputs signals in the configured downlink subframes to IFFT section 108.

IFFT section 108 applies IFFT processing for performing OFDM (orthogonal frequency division multiplexing) modulation to the signals in downlink subframes and obtains signals (OFDM symbols) having time waveforms. IFFT section 108 outputs the signals having time waveforms to CP adding section 109. Base station 100 is provided with as many IFFT sections 108 as a plurality of CCs (CC1 to CC3 in FIG. 5) configured for terminal 200. However, one IFFT section 108 may successively perform processing on signals of a plurality of downlink subframes corresponding to each CC, and in this case, a plurality of IFFT sections 108 may not be required.

CP adding section 109 adds a CP to the signals (each OFDM symbol in a subframe) received from IFFT section 108 and outputs the signals to radio transmitting section 110.

Radio transmitting section 110 performs radio modulation into a carrier frequency on the signals received from CP adding section 109 and transmits the modulated downlink signals to via antenna 111.

Radio receiving section 112 receives uplink signals (PUCCH signals) transmitted from one or a plurality of terminals 200 via antenna 111, performs radio demodulation and outputs the demodulated uplink signals to CP removing section 113.

CP removing section 113 removes a CP from respective SC-FDMA (single carrier-frequency division multiple access) symbols in the uplink signals and outputs the symbols without CPs to A/N signal extracting section 114.

A/N signal extracting section 114 extracts A/N signals of a plurality of terminals 200 included in the signals received from CP removing section 113. When extracting the A/N signals transmitted using PUCCH formats 1a/1b, A/N signal extracting section 114 extracts RBs, performs despreading using an orthogonal code sequence and performs correlation processing using a ZAC sequence based on RB numbers and code numbers determined by the A/N resource numbers used by terminal 200 that transmitted the A/N signals, and thereby obtains A/N signals. On the other hand, when extracting the A/N signals transmitted using PUCCH format 3, A/N signal extracting section 114 extracts RBs, and performs despreading processing using an orthogonal code sequence based on RB numbers and code numbers determined by the A/N resource numbers used by terminal 200 that transmitted the A/N signals, and thereby obtains A/N signals. A/N signal extracting section 114 outputs the A/N signals obtained to determining section 115.

Determining section 115 determines whether the A/N signal of each terminal 200 is an ACK or NACK. When the determination result is an ACK, determining section 115 outputs a signal prompting transmission of the next transmission data to retransmission control section 105. On the other hand, when the determination result is a NACK, determining section 115 outputs a signal prompting retransmission to retransmission control section 105.

[Configuration of Terminal]

Figure 8:
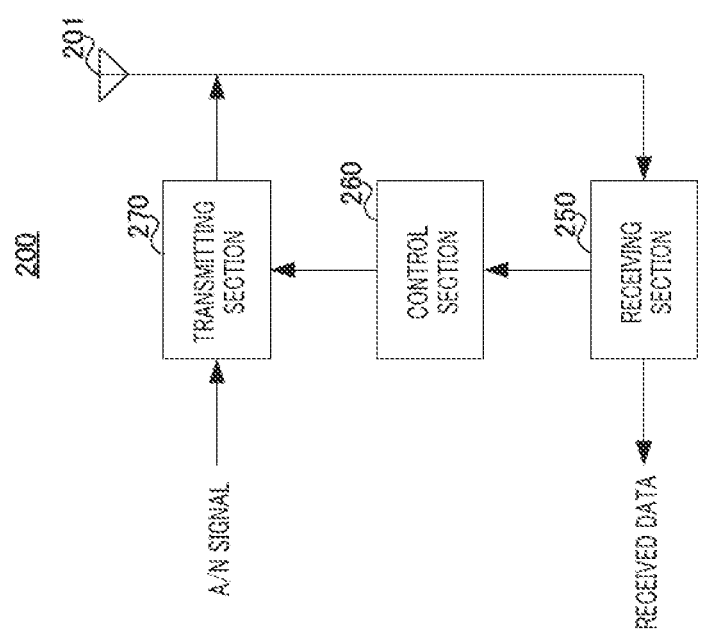
FIG. 8 is a block diagram illustrating main components of a terminal according to Embodiment 1 of the present invention.

FIG. 8 illustrates a block diagram of main components of terminal 200.

Terminal 200 receives control information allocated to PDCCH or ePDCCH in one or a plurality of CCs and data information (downlink data) allocated to PDSCH in one or a plurality of CCs in a downlink. Furthermore, terminal 200 transmits A/N signals in one CC in the uplink.

When the use of ePDCCH is indicated from base station 100, terminal 200 monitors (blind-decodes) regions (search spaces) of both ePDCCH and PDCCH to which control information intended for terminal 200 may have been allocated in order to detect control information of terminal 200. Terminal 200 becomes a PDCCH terminal when PDCCH includes control information of terminal 200 and becomes an ePDCCH terminal when ePDCCH includes control information of terminal 200. Alternatively, operation may be such that terminal 200 becomes an ePDCCH terminal when specified to receive control information of ePDCCH, and becomes a PDCCH terminal when specified to receive control information of PDCCH. Hereinafter, the terminal operation will be described using the former as the premise.

In FIG. 8, receiving section 250 receives downlink data and control information transmitted from base station 100 in each of a plurality of CCs including one first CC (PCell) and one or a plurality of second CCs (SCells).

Control section 260 determines a PUCCH format and A/N resources for transmitting A/N signals in accordance with the received control information. When control information is received using only one second CC (SCell) among a plurality of CCs, control section 260 determines response signal resources (PUCCH format and A/N resources) used for transmission of A/N signals corresponding to downlink data based on an index (ARI) included in the control information of the above-described one second CC. Here, the response signal resources determined based on the index (ARI) of the second CC are first resources (A/N resources of PUCCH formats 1a/1b) for transmission of response signals corresponding to downlink data transmitted using only a single CC or second resources (A/N resources of PUCCH format 3) for transmission of a plurality of response signals corresponding to downlink data transmitted using each of a plurality of CCs.

Transmitting section 270 transmits, by radio, A/N signals of received data using the determined PUCCH format and A/N resources.

Figure 9:
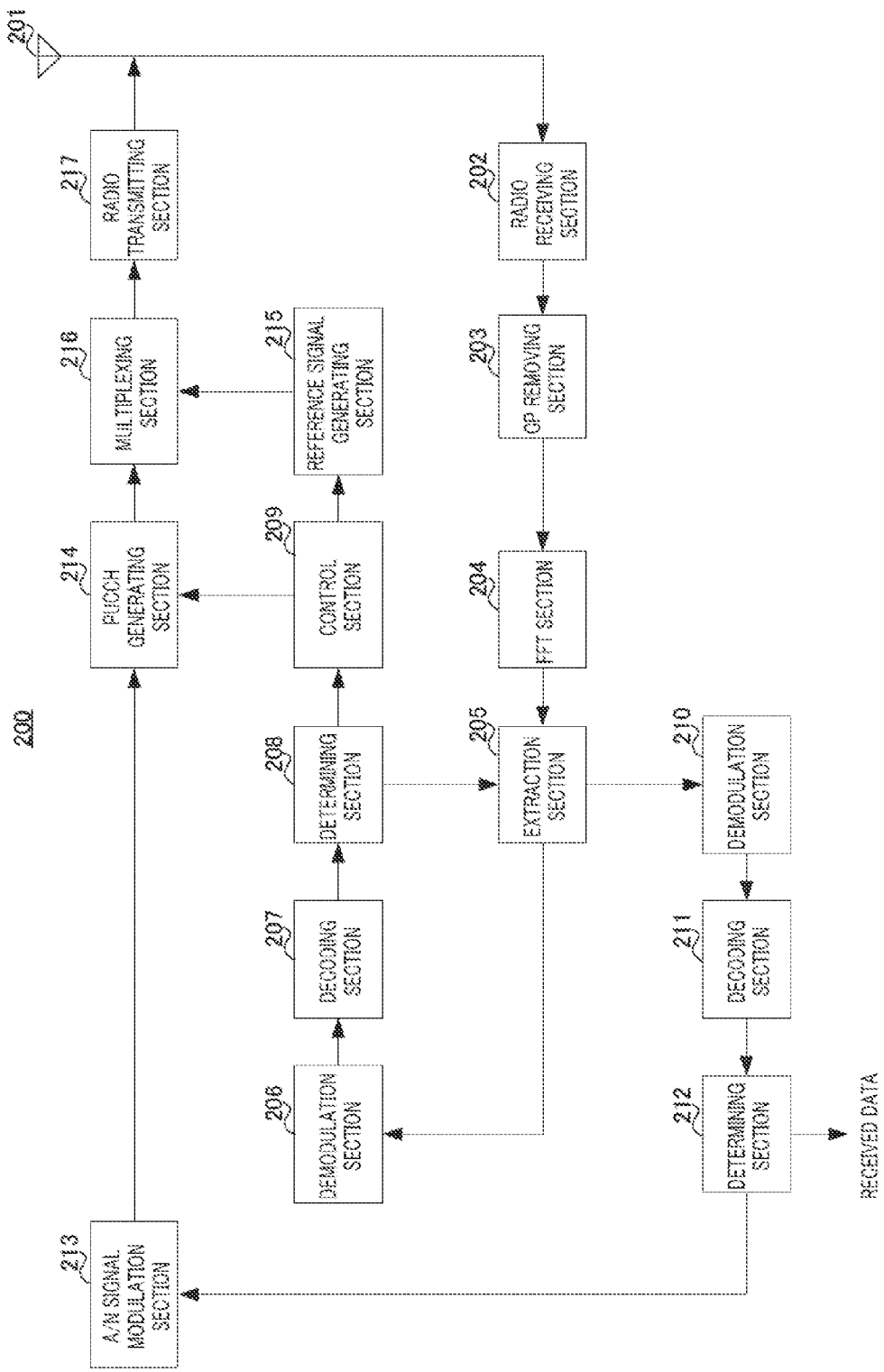
FIG. 9 is a block diagram illustrating a configuration of the terminal according to Embodiment 1 of the present invention.

FIG. 9 is a block diagram illustrating a configuration of terminal 200 according to the present embodiment.

In FIG. 9, terminal 200 includes antenna 201, radio receiving section 202, CP removing section 203, FFT (fast Fourier transform) section 204, extraction section 205, demodulation section 206, decoding section 207, determining section 208, control section 209, demodulation section 210, decoding section 211, determining section 212, A/N signal modulation section 213, PUCCH generating section 214, reference signal generating section 215, multiplexing section 216, and radio transmitting section 217.

Among these components, control section 209 mainly functions as control section 260. The configuration from A/N signal modulation section 213 to radio transmitting section 217 mainly function as transmitting section 270 and the configuration from radio receiving section 202 to determining section 208 and from radio receiving section 202 to determining section 212 mainly function as receiving section 250.

Note that in order to avoid description from becoming complicated, components associated with reception of downlink control information (PDCCH, ePDCCH) and downlink data (PDSCH) in the downlink and transmission of uplink control information PUCCH (A/N signal) closely associated with the present invention will be described, and illustration and description of components associated with transmission of uplink data will be omitted.

Radio receiving section 202 receives downlink signals (OFDM signals) in one or a plurality of CCs transmitted from base station 100 via antenna 201, performs radio demodulation and outputs the demodulated received signals to CP removing section 203.

CP removing section 203 removes a CP from each received signal received from radio receiving section 202 (signal having a time waveform which is each OFDM symbol in a subframe) and outputs the signal without CP to FFT section 204.

FFT section 204 applies FFT processing for OFDM demodulation to the signals having time waveforms and obtains signals in frequency domain (downlink subframe signals in one or a plurality of CCs). FFT section 204 outputs the obtained downlink subframe signals to extraction section 205.

Extraction section 205 extracts control information intended for terminal 200 from a region to which PDCCH is allocated (PDCCH region) or a region to which ePDCCH is allocated (ePDCCH region) out of the downlink subframe signals in one or a plurality of CCs. More specifically, extraction section 205 extracts one or a plurality of control information candidates from a resource region to which control information intended for terminal 200 may have been allocated and outputs the extracted control information candidates to demodulation section 206. In this case, the control information candidates may be extracted in the PDCCH region or extracted in the ePDCCH region. Upon receiving an extraction result of control information intended for terminal 200 from determining section 208 (which will be described later), extraction section 205 extracts a data signal (PDSCH) intended for terminal 200 from the downlink subframe signals based on resource allocation information included in the control information and outputs the data signal to demodulation section 210.

Demodulation section 206 demodulates the control information candidates (one or a plurality of pieces of control information) and outputs the demodulation result to decoding section 207.

Decoding section 207 decodes the demodulation result (one or a plurality of demodulated sequences) and outputs the decoding result to determining section 208.

Determining section 208 determines whether or not the decoding result (one or a plurality of decoding results) is control information intended for terminal 200 using terminal ID information. A CRC bit or the like masked with terminal ID information of terminal 200 included in the control information is used for this determination. Upon determining that the decoding result is control information intended for terminal 200, determining section 208 outputs the control information to extraction section 205 and control section 209.

Control section 209 determines a PUCCH format and A/N resource numbers for transmitting A/N signals based on the control information received from determining section 208.

For example, when an ARI is not included in the control information, control section 209 determines A/N resource numbers of PUCCH formats 1a/1b based on a conventional implicit A/N resource allocation method. Control section 209 determines an orthogonal spreading sequence, amount of cyclic shift and frequency resource block (RB) for generating A/N signals in PUCCH formats 1a/1b and reference signals from the determined A/N resource numbers. These pieces of information are outputted to PUCCH generating section 214 and reference signal generating section 215.

On the other hand, when an ARI is included in the control information, control section 209 determines a PUCCH format and A/N resource numbers specified by the ARI. Suppose the method of determining the PUCCH format and A/N resource numbers using the ARI is determined previously or indicated from base station 100 through RRC control information or the like. When using PUCCH formats 1a/1b, control section 209 determines an orthogonal spreading sequence, an amount of cyclic shift and a frequency resource block (RB) for generating A/N signals in PUCCH formats 1a/1b and reference signals from the determined A/N resource numbers. These pieces of information are outputted to PUCCH generating section 214 and reference signal generating section 215. When using PUCCH format 3, control section 209 determines an orthogonal spreading sequence used for A/N signals in PUCCH format 3, and an orthogonal spreading sequence, an amount of cyclic shift and an RB for generating reference signals, from the determined A/N resource numbers. These pieces of information are outputted to PUCCH generating section 214 and reference signal generating section 215.

Demodulation section 210 demodulates the data signals intended for terminal 200 received from extraction section 205 and outputs the demodulation result to decoding section 211.

Decoding section 211 decodes the demodulation result received from demodulation section 210 and outputs the decoding result to determining section 212.

Determining section 212 determines whether or not the decoding result is correct using a CRC masked with a terminal ID of terminal 200. When the decoding result is correct, determining section 212 outputs an ACK signal to A/N signal modulation section 213 and extracts the received data. On the other hand, when the decoding result is not correct, determining section 212 outputs a NACK signal to A/N signal modulation section 213.

A/N signal modulation section 213 generates modulated symbols of different values depending on whether the signal received from determining section 212 is an ACK signal or NACK signal. A/N signal modulation section 213 outputs the generated modulated symbols to PUCCH generating section 214.

PUCCH generating section 214 generates a PUCCH signal based on the modulated symbols received from A/N signal modulation section 213 and information on the PUCCH format and the A/N resource numbers received from control section 209. PUCCH generating section 214 outputs the generated PUCCH signal to multiplexing section 216.

Reference signal generating section 215 generates a reference signal based on the information on the PUCCH format and information on the A/N resource numbers received from control section 209 and outputs the generated reference signal to multiplexing section 216.

Multiplexing section 216 time-division-multiplexes the PUCCH signal received from PUCCH generating section 214 and the reference signal received from reference signal generating section 215, generates a PUCCH subframe signal (uplink signal) and outputs the PUCCH subframe signal to radio transmitting section 217.

Radio transmitting section 217 performs radio modulation on an uplink signal into a carrier frequency band and transmits, by radio, the uplink signal from antenna 201.

[Operations of Base Station 100 and Terminal 200]

Operations of base station 100 and terminal 200 having the above-described configurations will be described. Hereinafter, processing of base station 100 and terminal 200 according to the present embodiment will be described in steps (1) to (5).

[Step (1): Indication of RRC Control Information]

Before transmission of PDSCH, base station 100 previously indicates to each terminal 200 through RRC control information or the like, whether or not CA is configured, the number of CCs when CA is configured, regions (search spaces) in PDCCH and ePDCCH where control information may be possibly transmitted and parameters necessary for terminal 200 to transmit A/N signals using PUCCH. Furthermore, base station 100 previously specifies a PUCCH format and A/N resource numbers corresponding to the value of an ARI included in the control information. In the following description, suppose use of PUCCH format 3 is previously indicated as a method of feeding back A/N signals when downlink data is assigned to a plurality of CCs.

[Step (2): PDSCH Allocation]

Base station 100 determines terminal 200 to which downlink data (PDSCH) is allocated in each subframe and allocates downlink data to PDSCHs in one or a plurality of CCs for terminal 200. The amount of data for each terminal 200, CSI feedback transmitted by terminal 200, sounding reference signal (SRS) or the like are used for data allocation (scheduling).

[Step (3): PDCCH Allocation or ePDCCH Allocation]

Base station 100 generates control information including a scheduling result (that is, resource allocation information) for each terminal 200 and allocates the generated control information to PDCCHs and ePDCCHs in one or a plurality of CCs. A search space for which blind decoding is performed in PDCCH and ePDCCH differs from one terminal 200 to another. Thus, base station 100 allocates control information intended for each terminal 200 in each search space for each terminal 200. Part of or a whole search space may overlap or may differ completely among a plurality of terminals 200.

[Step (3-1): Operation for Terminal 200 in System Earlier than Rel.10]

When allocating control information to terminal 200 corresponding to systems earlier than Rel.10, base station 100 follows the aforementioned conventional rules (e.g., see FIG. 2) to allocate control information and allocate a PUCCH format and A/N resources specified for terminal 200.

[Step (3-2): Operation on Terminal 200 Corresponding to Rel.11 System]

On the other hand, base station 100 determines a PUCCH format and A/N resource numbers specified for terminal 200 when allocating control information for terminal 200 corresponding to a Rel.11 system.

Figure 10A:
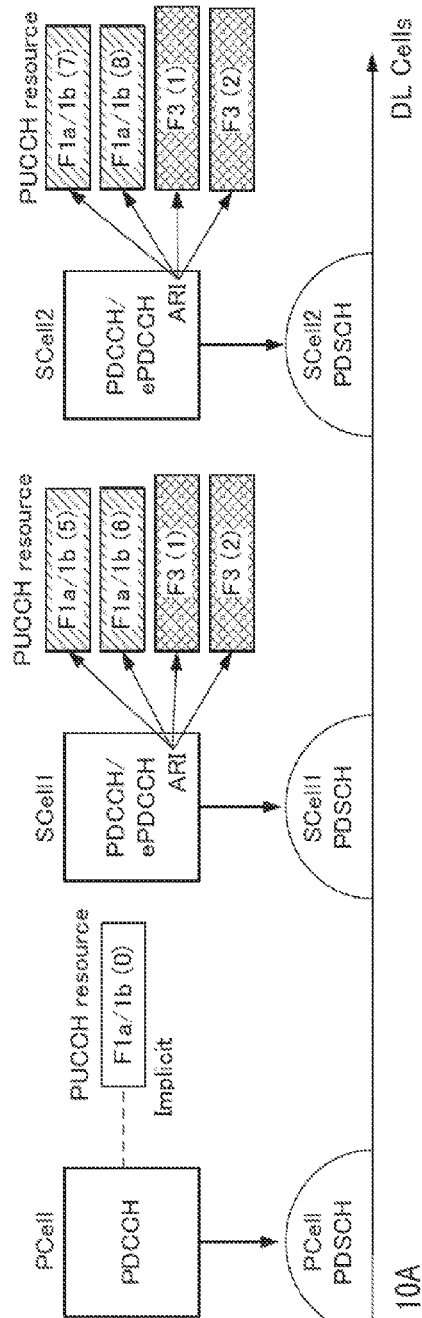
FIGS. 10A and 10B illustrate an example of allocation of A/N resources according to Embodiment 1 of the present invention.
Figure 10B:
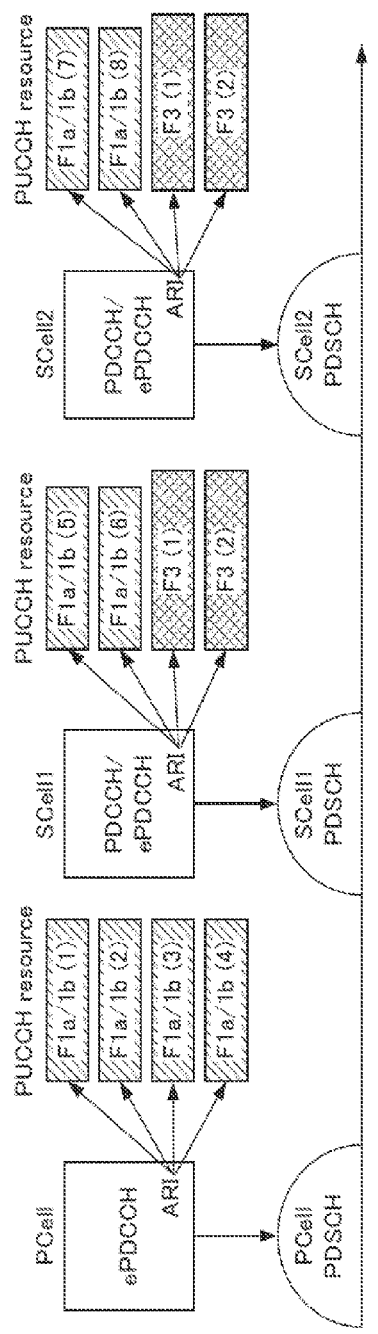

FIGS. 10A and 10B illustrate an example of a method of determining a PUCCH format and A/N resource numbers for terminal 200 corresponding to the Rel.11 system. In FIGS. 10A and 10B, CA using three CCs (PCell, SCell1, SCell2) for terminal 200 is configured. FIG. 10A illustrates a case where control information of PCell is transmitted using PDCCH and FIG. 10B illustrates a case where control information of PCell is transmitted using ePDCCH. As shown in FIG. 10A, control information transmitted using PDCCH of PCell includes no ARI, whereas as shown in FIG. 10B, control information transmitted using ePDCCH of PCell includes an ARI. Note that the control information of SCell includes an ARI irrespective of which of PDCCH or ePDCCH is used to transmit the control information, and therefore SCell need not be distinguished between FIG. 10A and FIG. 10B.

In FIG. 10A, F1a/1b(0), F1a/1b(5) to (8) represent different A/N resource numbers of PUCCH formats 1a/1b, and F3(1) and F3(2) represent different A/N resource numbers of PUCCH format 3. In FIG. 10B, F1a/1b(1) to (8) represent different A/N resource numbers of PUCCH formats 1a/1b, and F3(1) and F3(2) represent different A/N resource numbers of PUCCH format 3.

The ARIs included in control information of a plurality of SCells indicate A/N resource numbers (F3(1) or F3(2)) of PUCCH format 3 common (identical) among SCells regardless of to which SCell the control information corresponds. On the other hand, the ARIs included in control information of a plurality of SCells indicate A/N resource numbers (F1a/1b(5), (6) or F1a/1b(7), (8)) of PUCCH formats 1a/1b which differs from one SCell to another.

[Step (3-2-1): When Control Information of PCell is Transmitted Using PDCCH (FIG. 10A)]

In FIG. 10A, when transmitting downlink data to allocation target terminal 200 using a plurality of CCs, base station 100 specifies A/N resource number F3(1) or F3(2) of PUCCH format 3 using an ARI included in control information of SCell. In this case, base station 100 makes the value of ARI identical among a plurality of SCells (SCell1 and SCell2).

When transmitting downlink data to allocation target terminal 200 using only PCell, since the control information of PCell includes no ARI, base station 100 does not specify a PUCCH format and A/N resource numbers. In this case, A/N resources used in terminal 200 are determined according to equation 1 as in the case of the prior art.

When transmitting downlink data to allocation target terminal 200 using only single SCell, base station 100 specifies one A/N resource number to be used by terminal 200 from among A/N resource numbers F1a/1b(5) to (8) of a plurality of PUCCH formats 1a/1b using an ARI included in control information of SCell. Note that base station 100 selects a PUCCH format and A/N resource numbers for terminal 200 specified by the ARI so as not to overlap with PUCCH formats and A/N resource numbers used by other terminals 200 to feed back A/N signals.

[Step (3-2-2): When Control Information of PCell is Transmitted Using ePDCCH (FIG. 10B)]

In FIG. 10B, when transmitting downlink data to allocation target terminal 200 using a plurality of CCs, base station 100 specifies A/N resource number F3(1) or F3(2) of PUCCH format 3 using an ARI included in control information of SCell. At this time, base station 100 makes the ARI value identical among a plurality of SCells (SCell1 and SCell2).

On the other hand, when transmitting downlink data to allocation target terminal 200 using only PCell, base station 100 specifies one A/N resource number to be used by terminal 200 from among A/N resources F1a/1b(1) to (4) of a plurality of PUCCH formats 1a/1b using an ARI included in control information of PCell.

When transmitting downlink data to allocation target terminal 200 using only single SCell, base station 100 specifies one A/N resource number to be used by terminal 200 from among A/N resources F1a/1b(5) to (8) of a plurality of PUCCH formats 1a/1b using an ARI included in control information of SCell. Note that base station 100 selects a PUCCH format and A/N resource numbers for terminal 200 specified by an ARI so as not to overlap with PUCCH formats and A/N resource numbers used by other terminals 200 to feed back A/N signals.

Thus, in step (3-2), base station 100 (control information generating section 101) specifies, using an ARI of SCell, A/N resources of PUCCH formats 1a/1b or A/N resources of PUCCH format 3 as resources to be used by terminal 200 for transmission of A/N signals.

Note that base station 100 may perform above-described steps (3-1) and (3-2) in any order. In case it is not possible to avoid collision of PUCCH formats and A/N resource numbers between allocation target terminal 200 and other terminals 200 no matter how resources may be allocated, base station 100 may not perform data allocation to terminal 200 or may attempt to perform data allocation to different terminals 200.

[Step (4): PDSCH Allocation]

Upon completion of allocation of control information relating to allocation of downlink data to all terminals 200, base station 100 allocates downlink data intended for terminal 200 to which downlink data is to be allocated to PDSCHs of one or a plurality of CCs. Upon completion of allocation of downlink data, base station 100 transmits, by radio, the downlink data allocated to one or a plurality of CCs.

[Step (5): Feedback of A/N Signal]

Terminal 200 extracts control information intended for terminal 200 from signals transmitted from base station 100 and extracts/decodes downlink data based on the extracted control information (resource allocation information). Moreover, terminal 200 identifies a PUCCH format and A/N resources used for transmission of A/N signals corresponding to the received downlink data based on the extracted control information.

Figure 2:
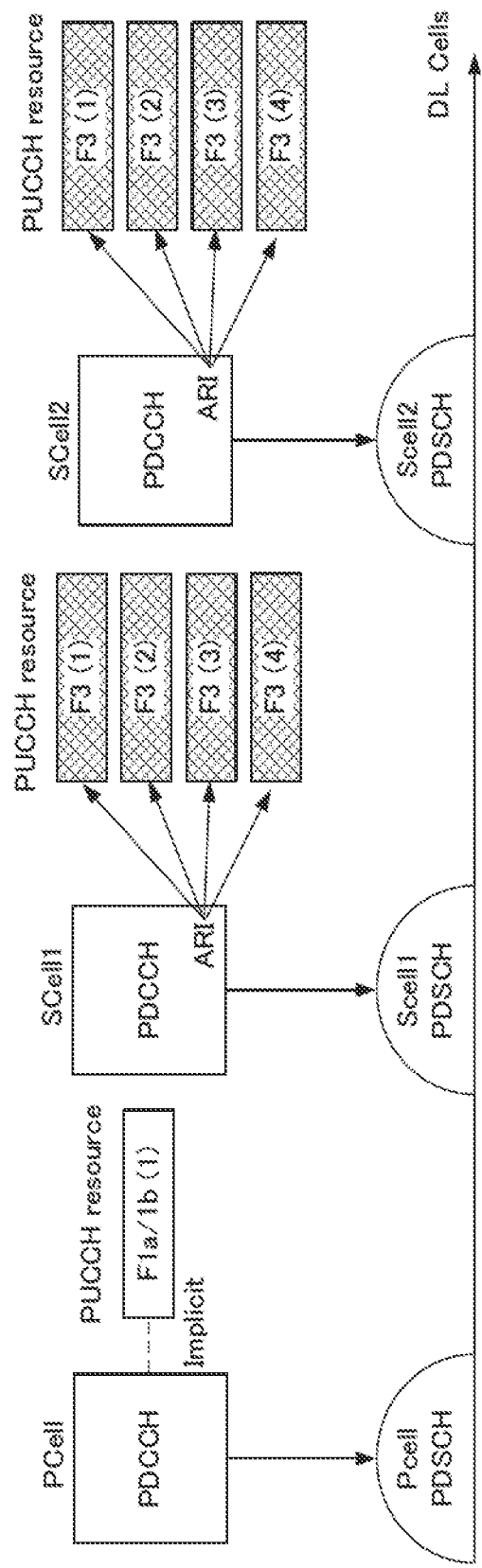
FIG. 2 illustrates an example of allocation of A/N resources when CA using three CCs is configured.
Figure 3:
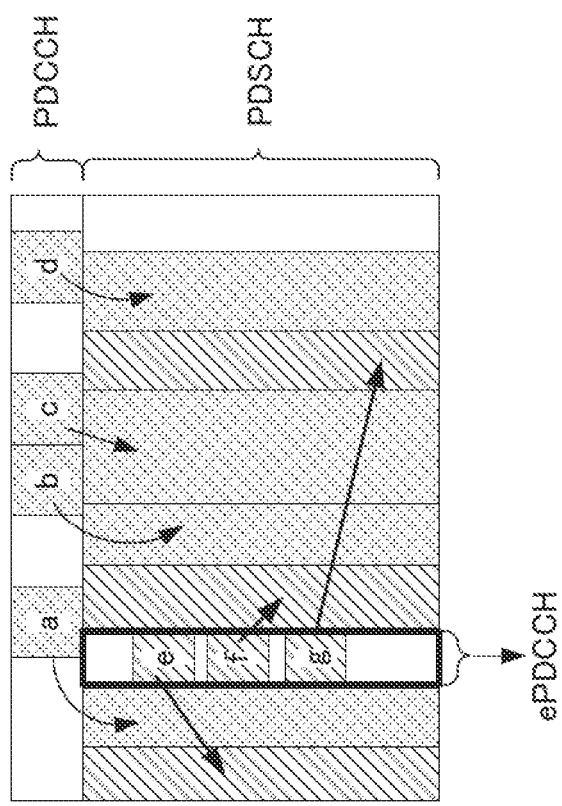
FIG. 3 illustrates an example of allocation of PDSCH using ePDCCH.
Figure 4:
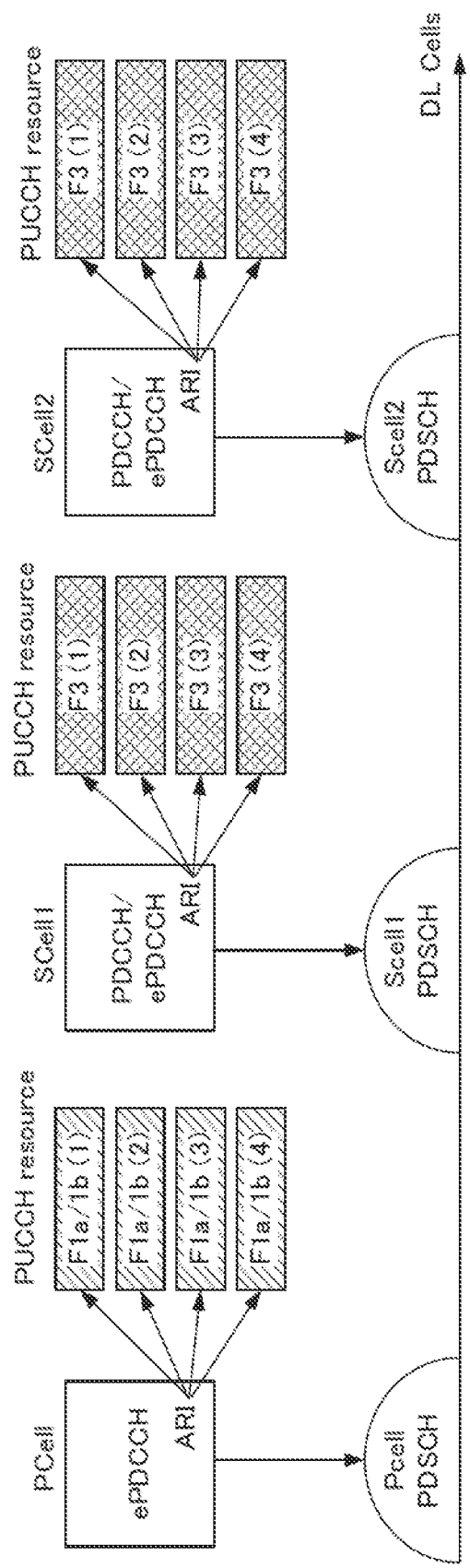
FIG. 4 illustrates an example of ARI operation when control information of PCell is transmitted using ePDCCH.

For example, terminal 200 corresponding to a system earlier than Rel.10 identifies a PUCCH format and A/N resources for transmitting A/N signals according to conventional rules (e.g., see FIG. 2).

On the other hand, terminal 200 corresponding to a Rel.11 system identifies a PUCCH format and A/N resources for transmitting A/N signals according to (i) to (iv) below.

(i) When only control information of PCell is detected in PDCCH, terminal 200 feeds back A/N signals using A/N resources of PUCCH formats 1a/1b (F1a/1b(0) in FIG. 10A)

implicitly determined according to equation 1 assuming that downlink data is allocated to only P Cell.

(ii) When only control information of PCell is detected in ePDCCH, terminal 200 feeds back A/N signals using A/N resources of PUCCH formats 1a/1b (one of F1a/1b(1) to (4) in FIG. 10B) specified by an ARI included in the control information detected in PCell of ePDCCH assuming that downlink data is allocated to only PCell.

(iii) When only control information of SCell is detected in PDCCH or ePDCCH, terminal 200 feeds back A/N signals using a PUCCH format and A/N resources specified by an ARI included in control information detected in SCell of PDCCH or ePDCCH (A/N resources of PUCCH formats 1a/1b or PUCCH format 3) assuming that downlink data is allocated to only SCell. In this case, when the number of SCells with which base station 100 allocated downlink data to terminal 200 is one (when the number of bits of A/N signal is small), an A/N resource of PUCCH formats 1a/1b (one of F1a/1b(5) to (8)) is specified by an ARI of the one SCell. On the other hand, when base station 100 allocates downlink data to terminal 200 with a plurality of SCells (when the number of bits of an A/N signal is large), an A/N resource (one of F3(1) and F3(2)) of PUCCH format 3 is specified by an ARI.

(iv) When control information is detected in a plurality of CCs, terminal 200 feeds back A/N signals using A/N resources of PUCCH format 3 specified by an ARI included in control information detected in SCell (F3(1) or F3(2) in FIG. 10A and FIG. 10B).

The processing in base station 100 and terminal 200 has been described so far.

By so doing, it is possible to improve resource utilization efficiency of PUCCH when SCell is used. For example, when downlink data is allocated to only single SCell when CA is configured, PUCCH format 3 is always used to feed back A/N signals in the conventional method (see FIG. 2). As described above, PUCCH format 3 has only a small number of terminals that can be multiplexed and its resource utilization efficiency of PUCCH is low. In contrast, according to the present embodiment, terminal 200 can feed back A/N signals using A/N resources of PUCCH formats 1a/1b no matter which SCell is used.

Thus, when, for example, the amount of downlink data is large, base station 100 may transmit downlink data using a plurality of CCs and terminal 200 may feed back A/N signals using A/N resources of PUCCH format 3. On the other hand, when the amount of downlink data is small (when there is only downlink data with a single CC), base station 100 may transmit downlink data using one CC of PCell and SCell and terminal 200 may feed back A/N signals using A/N resources of PUCCH formats 1a/1b. According to the present embodiment, terminal 200 can use an appropriate PUCCH format according to the amount of downlink data no matter which CC is used for transmission of downlink data, and improve resource utilization efficiency of PUCCH (the amount of PUCCH resources occupied by terminal 200).

Furthermore, according to the present embodiment, terminal 200 can transmit/receive downlink data using SCell even in an environment with a poor uplink condition. As described above, compared to PUCCH format 3, PUCCH formats 1a/1b have lower required quality (required SINR) and is a robust format. Therefore, using PUCCH formats 1a/1b allows A/N signals to be transmitted/received even in a poor environment. Thus, even when downlink data is allocated to only SCell, using PUCCH formats 1a/1b for transmission of A/N signals makes it possible to maintain high HARQ quality.

Moreover, according to the present embodiment, more terminals 200 can be off-loaded to a small cell covering a narrower area in a HetNet/CoMP environment in which interference control is performed using CA.

Figures 11A, 11B:
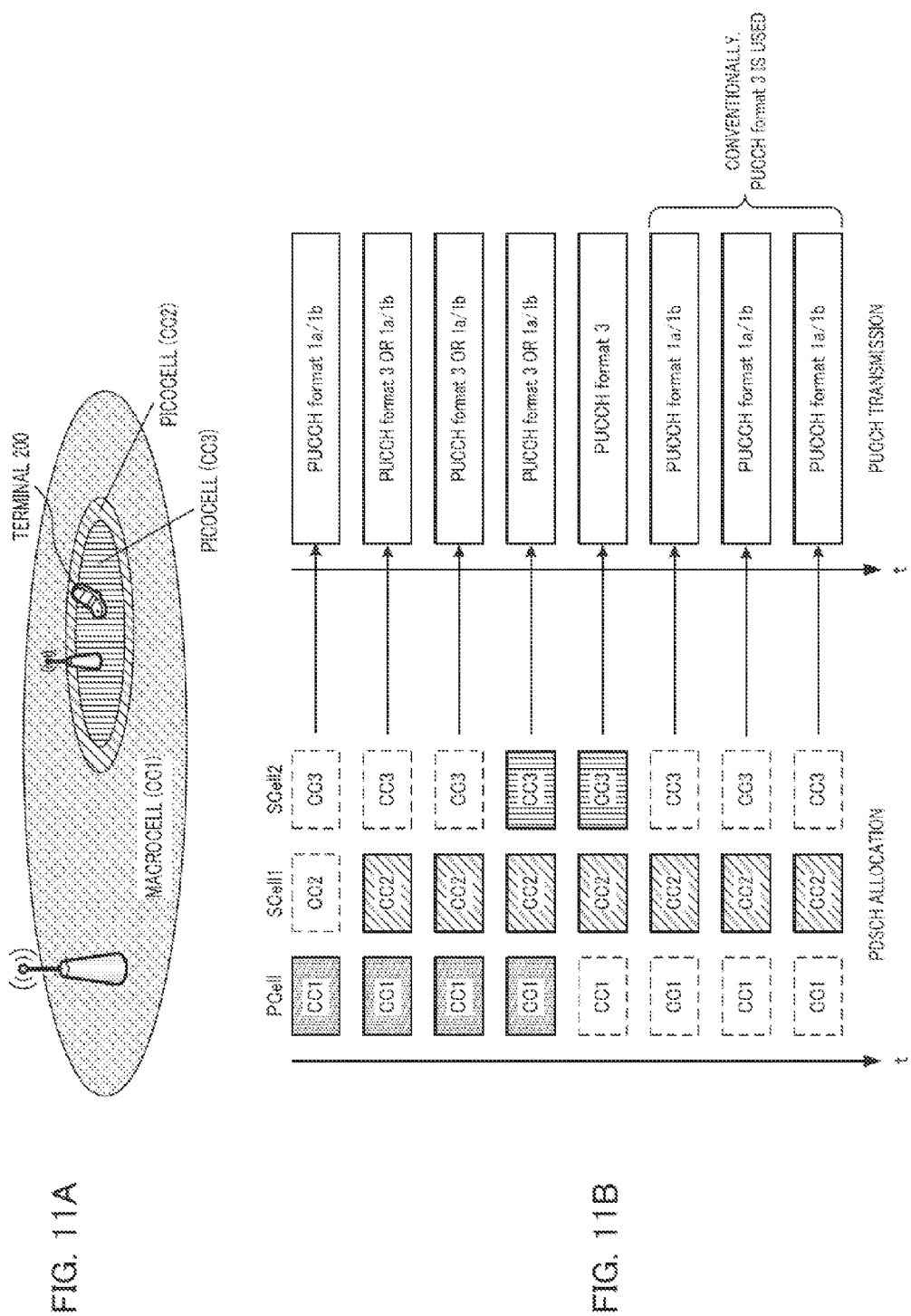
FIGS. 11A and 11B illustrate an example of operation in a HetNet/CoMP environment according to Embodiment 1 of the present invention.

FIG. 11A illustrates a communication system in a HetNet/CoMP environment in which CA is configured with three CCs. In FIG. 11A, the system is operated with one macrocell (corresponding to CC1) and two picocells (corresponding to CC2 and CC3). For terminal 200 shown in FIG. 11A, the macrocell corresponds to PCell and picocells correspond to SCell1 and SCell2. FIG. 11B illustrates an example of PDSCH (downlink data) allocation and PUCCH (A/N signal) transmission corresponding to the PDSCH allocation. In the PDSCH allocation shown in FIG. 11B, a box shown by a solid line represents a CC having downlink data allocation for terminal 200 and a box shown by a dotted line represents a CC having no downlink data allocation for terminal 200.

In the environment shown in FIG. 11A, in order to distribute traffic of the macrocell (PCell) which has to cover a wide area, it is preferable to off-load the macrocell to the picocell covering a narrow area (SCell, that is, a small cell).

PUCCH is always transmitted using PCell. In Rel.10, when SCell is used, A/N signals are always transmitted using PUCCH format 3. For this reason, in a system earlier than Rel.10, even when off-loading to the picocell (SCell) is implemented in the downlink to distribute the downlink traffic among a plurality of CCs, the traffic of uplink PUCCH is not only not distributed but also the number of terminals that can be simultaneously multiplexed using PUCCH format 3 is reduced.

In contrast, according to the present embodiment, even when off-loading to the picocell (SCell) is implemented in the downlink, terminal 200 can use PUCCH formats 1a/1b, and many terminals 200 can be multiplexed. For example, in FIG. 11B, even when PCell (CC1) is not used and only single SCell1 (CC2) is used, only PUCCH format 3 can be used in the prior art, whereas in the present embodiment, terminal 200 can use PUCCH formats 1a/1b. This improves resource utilization efficiency of PUCCH, making it possible to off-load the downlink of more terminals 200 to the picocell (SCell) without causing traffic congestion of PUCCHs in the uplink.

A case has been described in the present embodiment where the number of ARI bits is 2. However, the number of ARI bits is not limited to 2. For example, when the number of ARI bits is greater than 2, it is possible to select one resource from among more A/N resource candidates, thereby improve the degree of freedom of A/N resource allocation and further reduce the probability of collision of A/N resources among terminals 200. On the other hand, when the number of ARI bits is smaller than 2, overhead of control information is reduced, and it is possible to reduce the coding rate of control information and improve quality accordingly.

In the present embodiment, a PUCCH format and A/N resource numbers that can be specified by an ARI included in control information transmitted using ePDCCH may be implicitly associated with allocation positions of downlink control information or allocation positions of downlink data. Examples of parameters implicitly associated with a PUCCH format and A/N resource numbers include an ePDCCH resource number (eCCE index) to which control information is allocated, eREG number which is a resource unit making up eCCE, RB number of PDSCH to which downlink data is allocated or antenna port number of an antenna port through which ePDCCH is transmitted. By partially implicitly associating a PUCCH format and A/N resource numbers with ePDCCH or PDSCH resource numbers, it is possible to avoid overlapping of A/N resources with other terminals 200 whose resource numbers at least do not overlap with them and reduce the probability of collision of A/N signals.

Furthermore, in the present embodiment, combinations of a PUCCH format and A/N resource numbers specifiable by an ARI included in SCell control information may be switched using RRC control information or the like. For example, control may be exercised so as to specify PUCCH format 3 with all values that can be taken by an ARI. This makes it possible to realize the same operation as systems earlier than Rel.10. Control may be exercised such that of all values that can be taken by an ARI, only one value specifies PUCCH format 3 and all the remaining values specify PUCCH formats 1a/1b. By reducing ARIs that specify PUCCH format 3 and increasing ARIs that specify PUCCH formats 1a/1b, it is possible to reduce the probability of collision of A/N signals among terminals 200 when transmitting A/N signals using PUCCH formats 1a/1b.

In the present embodiment, when control information of PCell is transmitted/received using PDCCH, only A/N resource numbers of PUCCH format 3 may be specified using an ARI included in control information of SCell as shown in FIG. 2, and when control information of PCell is transmitted/received using ePDCCH, both a PUCCH format and A/N resource numbers may be specified using an ARI included in control information of SCell as shown in FIG. 10B. In this case, resources specified by an ARI corresponding to both a case where control information of PCell is transmitted/received using PDCCH and a case where control information of PCell is transmitted/received using ePDCCH, may be previously indicated using RRC control information or the like. Thus, when mapping control information of PCell intended for certain terminal 200 to ePDCCH, if other terminals 200 use both PUCCH format and A/N resources (that is, when none of resources is available), base station 100 can increase the number of A/N resource candidates of PUCCH format 3 used for transmission of A/N signals transmitted by terminal 200 by re-mapping control information of PCell intended for terminal 200 to PDCCH.

Embodiment 2

The method of using an ARI shown in Embodiment 1 (e.g., FIG. 10B) has an additional problem that the uplink resource utilization efficiency deteriorates. For example, when downlink data is allocated for a certain terminal using a plurality of CCs, the base station must reserve one A/N resource of PUCCH formats 1a/1b and one A/N resource of PUCCH format 3 for the terminal using an ARI of PCell and an ARI of SCell respectively. Therefore, the base station cannot allocate these two A/N resources to other terminals.

For example, in FIG. 10B, suppose downlink data is allocated using three CCs, F1a/1b(2) is specified by an ARI of PCell and F3(1) is specified by both ARIs of SCell1 and SCell2. In this case, when the terminal can correctly detect control information of at least one SCell, the terminal feeds back an A/N signal using F3(2) specified by the ARI of SCell. On the other hand, when the terminal can detect no control information of SCell but detect only control information of PCell, the terminal feeds back an A/N signal using F1a/1b(2) specified by the ARI of PCell. That is, in FIG. 10B, since A/N signals may be transmitted using different PUCCH formats depending on whether or not control information of each CC has been detected in the terminal, the base station cannot allocate these two A/N resources to other terminals. In this way, although only one of the two A/N resources reserved for a certain terminal is used by the terminal, these two A/N resources cannot be allocated to other terminals. This causes resource utilization efficiency of the uplink to deteriorate.

Thus, the present embodiment will describe an A/N resource allocation method that improves resource utilization efficiency in the uplink when control information of PCell is transmitted using ePDCCH.

The present embodiment is different from Embodiment 1 in an A/N resource allocation method when control information of PCell is transmitted using ePDCCH. Note that since a base station and a terminal according to the present embodiment have basic configurations common to those of base station 100 and terminal 200 according to Embodiment 1, these will be described with reference to FIG. 7 and FIG. 9.

Hereinafter, operations of base station 100 and terminal 200 according to the present embodiment will be described.

Of the processing (steps (1) to (5)) of base station 100 and terminal 200 according to Embodiment 1, only differences between the present embodiment and Embodiment 1 will be described. More specifically, since steps (1), (2) and (4) in the present embodiment are the same as those in Embodiment 1, steps (3) and (5) (hereinafter, represented by steps (3)' and (5)') will be described.

[Step (3)': PDCCH Allocation or ePDCCH Allocation]

Since step (3-1) and step (3-2-1) are the same as those in Embodiment 1, description thereof will be omitted, and step (3-2-2) (hereinafter, represented by step (3-2-2)') will be described.

Figure 12A:
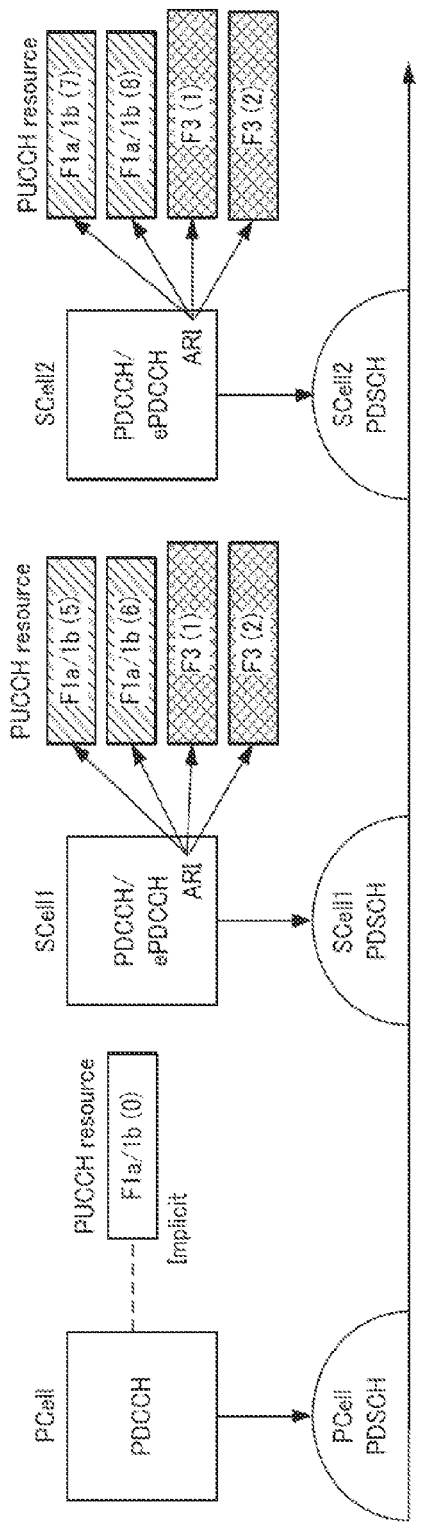
FIGS. 12A and 12B illustrate an example of allocation of A/N resources according to Embodiment 2 of the present invention.
Figure 12B:
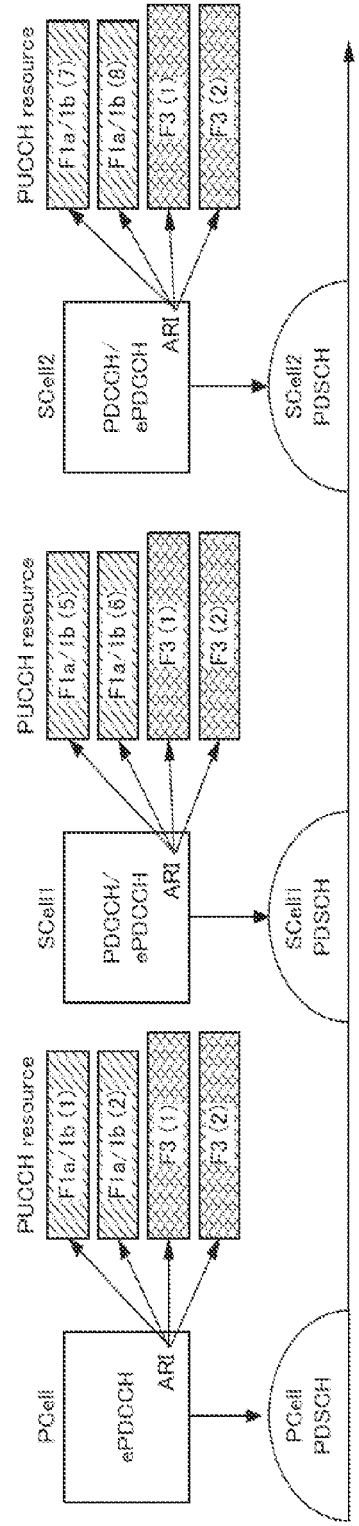

Here, FIGS. 12A and 12B illustrate an example of a method of determining a PUCCH format and A/N resource numbers for terminal 200 corresponding to a Rel.11 system. In FIGS. 12A and 12B as well as FIGS. 11A and 11B, CA using three CCs (PCell, SCell1, SCell2) is configured for terminal 200. Furthermore, FIG. 12A is identical to FIG. 10A, and illustrates a case where control information of PCell is transmitted using PDCCH. Furthermore, FIG. 12B as well as FIG. 10B illustrates a case where control information of PCell is transmitted using ePDCCH. Furthermore, in FIG. 12A and FIG. 12B, F1a/1b(1), F1a/1b(2), and F1a/1b(5) to (8) represent different A/N resource numbers of PUCCH formats 1a/1b, and F3(1) and F3(2) represent different A/N resource numbers of PUCCH format 3.

[Step (3-2-2)': When Control Information of PCell is Transmitted Using ePDCCH (FIG. 12B)]

In FIG. 12B, when transmitting downlink data using a plurality of CCs to allocation target terminal 200, base station 100 specifies A/N resource number F3(1) or F3(2) of PUCCH format 3 using an ARI included in control information of all CCs. In this case, base station 100 makes the ARI value identical among all CCs (PCell and SCell).

When transmitting downlink data to allocation target terminal 200 using only PCell, base station 100 specifies one A/N resource number to be used by terminal 200 from among A/N resources F1a/1b(1) and F1a/1b(2) of a plurality of PUCCH formats 1a/1b using an ARI included in control information of PCell.

When transmitting downlink data to allocation target terminal 200 using only single SCell, base station 100 specifies one A/N resource number to be used by terminal 200 from among A/N resources F1a/1b(5) to (8) of a plurality of PUCCH formats 1a/1b using an ARI included in control information of SCell. Note that base station 100 selects a PUCCH format and A/N resource numbers for terminal 200 specified by the ARI so as not to overlap with PUCCH formats and A/N resource numbers used by other terminals 200 to feed back A/N signals.

Thus, in step (3-2-2)', when control information of PCell is transmitted via ePDCCH, base station 100 (control information generating section 101) generates an A/N of PCell and specifies A/N resources of PUCCH formats 1a/1b or A/N resources of PUCCH format 3 as resources to be used for transmission of A/N signals to terminal 200 using the ARI of PCell. More specifically, when downlink data is transmitted using only PCell, base station 100 specifies one resource from among A/N resources of a plurality of PUCCH formats 1a/1b using the ARI of PCell. When downlink data is transmitted using each of a plurality of CCs, base station 100 specifies a resource identical to the resource specified by the ARI of SCell from among A/N resources of a plurality of PUCCH formats 3 using the ARI of PCell.

[Step (5)': Feedback of A/N Signal]

In step (5)', only method (ii) is different (hereinafter, referred to as "(ii)'") among methods (i) to (iv) of identifying a PUCCH format and A/N resources for transmitting A/N signals in terminal 200 corresponding to the Rel.11 system described in Embodiment 1.

(ii)' When only control information of PCell is detected in ePDCCH, terminal 200 assumes whether downlink data is allocated using only PCell or using a plurality of CCs based on the PUCCH format specified by an ARI included in the control information detected in PCell. That is, when the ARI specifies an A/N resource of PUCCH formats 1a/1b (one of F1a/1b(1) and F1a/1b(2) in FIG. 12B), terminal 200 assumes that downlink data is allocated using only PCell and feeds back an A/N signal using the A/N resource of PUCCH formats 1a/1b. On the other hand, when the ARI specifies an A/N resource of PUCCH format 3 (one of F3(1) and F3(2) in FIG. 12B), terminal 200 assumes that downlink data is allocated using a plurality of CCs including PCell and feeds back an A/N signal using the A/N resource of PUCCH format 3.

The processing in base station 100 and terminal 200 has been described so far.

By so doing, resource utilization efficiency of PUCCH further improves compared to Embodiment 1. More specifically, in the present embodiment, when control information of PCell is transmitted/received using ePDCCH, and when downlink data is transmitted using a plurality of CCs, base station 100 specifies a resource identical to an A/N resource specified by an ARI of SCell using an ARI of PCell. This allows terminal 200 to uniquely determine a PUCCH format and A/N resources used for transmission of A/N signals irrespective of a control information detection situation. That is, base station 100 need not secure A/N resources corresponding to both PUCCH formats 1a/1b and PUCCH format 3 for terminal 200 in case terminal 200 should fail to detect control information of cells other than PCell.

Figure 13A:
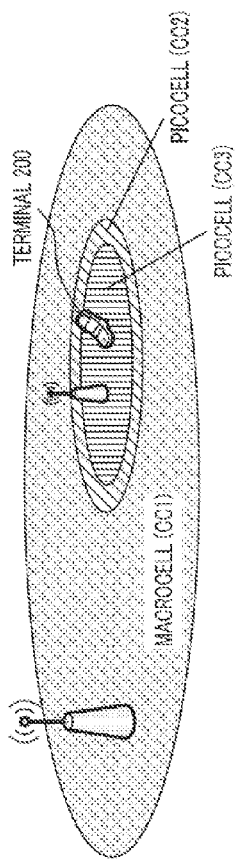
FIGS. 13A and 13B illustrate an example of operation in HetNet/CoMP environment according to Embodiment 2 of the present invention.
Figure 13B:
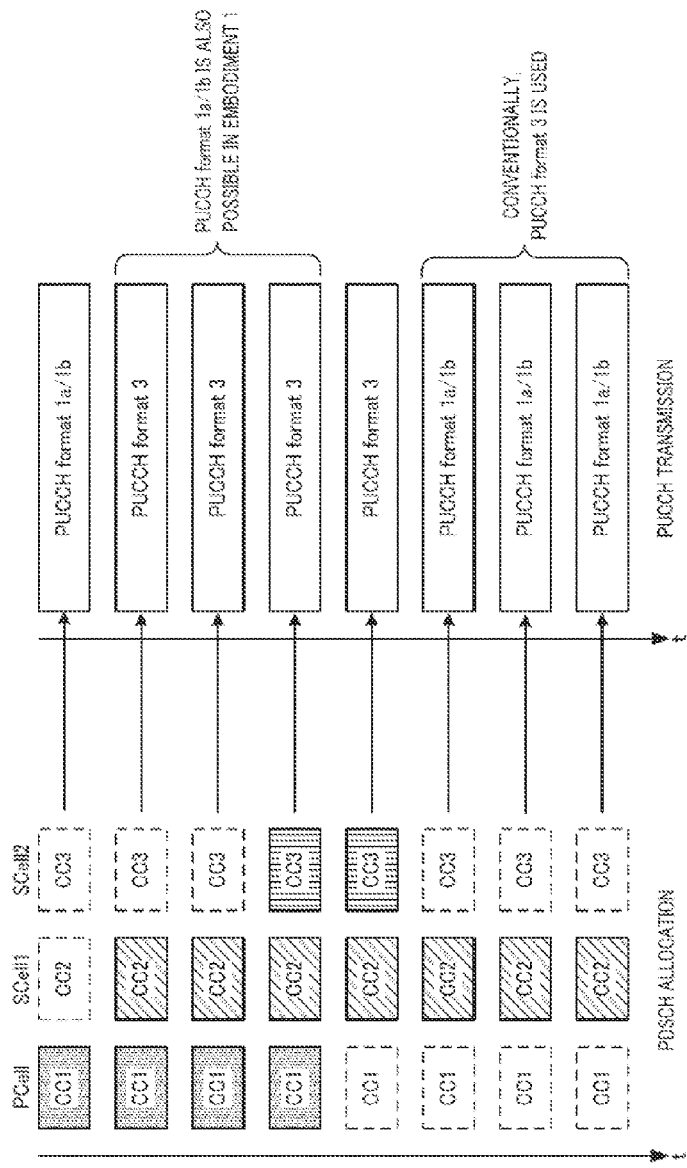

FIG. 13A illustrates a communication system in a HetNet/CoMP environment in which CA with three CCs is configured. FIG. 13A is identical to FIG. 11A. FIG. 13B illustrates an example of PDSCH (downlink data) allocation and PUCCH (A/N signal) transmission corresponding to the PDSCH allocation in the present embodiment.

According to the prior art (FIG. 2) or Embodiment 1 (FIG. 10B), when the terminal cannot detect control information of SCell, the terminal transmits A/N signals using A/N resources of PUCCH formats 1a/1b determined by control information of PCell. In that case, when downlink data is allocated to a plurality of CCs including PCell as described above, the base station specifies A/N resources of PUCCH format 3 using an ARI of SCell, and always needs to reserve A/N resources of PUCCH formats 1a/1b determined by control information of PCell in case the terminal should fail to detect control information of SCell. That is, according to the prior art (FIG. 2) or Embodiment 1, the base station always needs to allocate two A/N resources, only one of which is used, for the terminal.

In contrast, according to the present embodiment, when allocating downlink data in a plurality of CCs including PCell using ePDCCH, base station 100 specifies the same A/N resource of PUCCH format 3 using an ARI included in control information of all CCs including PCell.

For example, a comparison will be made between FIG. 11B (Embodiment 1) and FIG. 13B (the present embodiment), in a case where downlink data is allocated using CC1 and CC2 or a case where downlink data is allocated using CC1 to CC3. In FIG. 11B (Embodiment 1), the base station specifies A/N resources of PUCCH formats 1a/1b and PUCCH format 3 using an ARI included in control information of each CC such as CC1 and CC2 or CC1 to CC3. The terminal transmits an A/N signal using one of A/N resources of PUCCH formats 1a/1b and PUCCH format 3 in accordance with the control information detection result. In contrast, in FIG. 13B (the present embodiment), base station 100 specifies the same A/N resource of PUCCH format 3 using an ARI included in control information of each CC such as CC1 and CC2 or CC1 to CC3. Terminal 200 transmits an A/N signal using an A/N resource of PUCCH format 3 irrespective of the control information detection result.

This eliminates the possibility that terminal 200 may transmit A/N signals using PUCCH formats 1a/1b. Therefore, base station 100 always needs only to allocate one A/N resource (one of PUCCH formats 1a/1b and PUCCH format 3) for terminal 200. Thus, the present embodiment can further improve resource utilization efficiency of PUCCH compared to Embodiment 1.

Embodiment 3

According to Embodiments 1 and 2 (and conventional method), when PUCCH format 3 is configured as a PUCCH format for a plurality of CCs, PUCCH format 3 is always used when the number of CCs is equal to or greater than 2.

However, PUCCH format 3 is a PUCCH format to accommodate A/N signals of several tens of bits. Thus, using PUCCH format 3 to feed back A/N signals of a small number of bits, such as a case with two CCs where the number of bits of an A/N signal is on the order of 2 involves a problem of increasing overhead.

In Embodiment 2, it is possible to specify A/N resources of PUCCH formats 1a/1b which differ depending on an ARI included in control information of each CC or implicit allocation irrespective of which of PDCCH or ePDCCH is used to transmit/receive control information or which of PCell or SCell is used to transmit/receive control information (e.g., see FIG. 12A and FIG. 12B). Thus, the present embodiment focuses attention on the fact that different A/N resources of PUCCH formats 1a/1b can be specified by an ARI even when the number of CCs is two. More specifically, according to the present embodiment, when the number of actually used CCs among a plurality of CCs is 2, channel selection (that is, PUCCH format 1b with channel selection) is applied using two different A/N resources of PUCCH formats 1a/1b.

Note that since a base station and a terminal according to the present embodiment have basic configurations common to those of base station 100 and terminal 200 according to Embodiment 1, these will be described with reference to FIG. 7 and FIG. 9.

When downlink data is transmitted using only two CCs out of a plurality of CCs configured for terminal 200, base station 100 specifies different A/N resources of PUCCH formats 1a/1b using an ARI included in both pieces of control information of the two CCs respectively. Note that when one of the two CCs to which downlink data is allocated is PCell and the control information of PCell is transmitted using PDCCH (when no ARI is included), base station 100 specifies A/N resources of PUCCH formats 1a/1b using an ARI included in control information of the other SCell.

Terminal 200 detects control information of two CCs, and performs, when ARIs included in the control information of the two CCs indicate different A/N resources of PUCCH formats 1a/1b, channel selection using the indicated two different A/N resources. Moreover, when one of the two CCs is PCell and control information of the PCell is received using PDCCH (when no ARI is included), terminal 200 performs channel selection using A/N resources (PUCCH formats 1a/1b) determined by a CCE index allocated to control information of PDCCH and equation 1, and A/N resources (PUCCH formats 1a/1b) indicated by an ARI included in control information of SCell.

This further improves resource utilization efficiency of PUCCH.

Figures 14A, 14B:
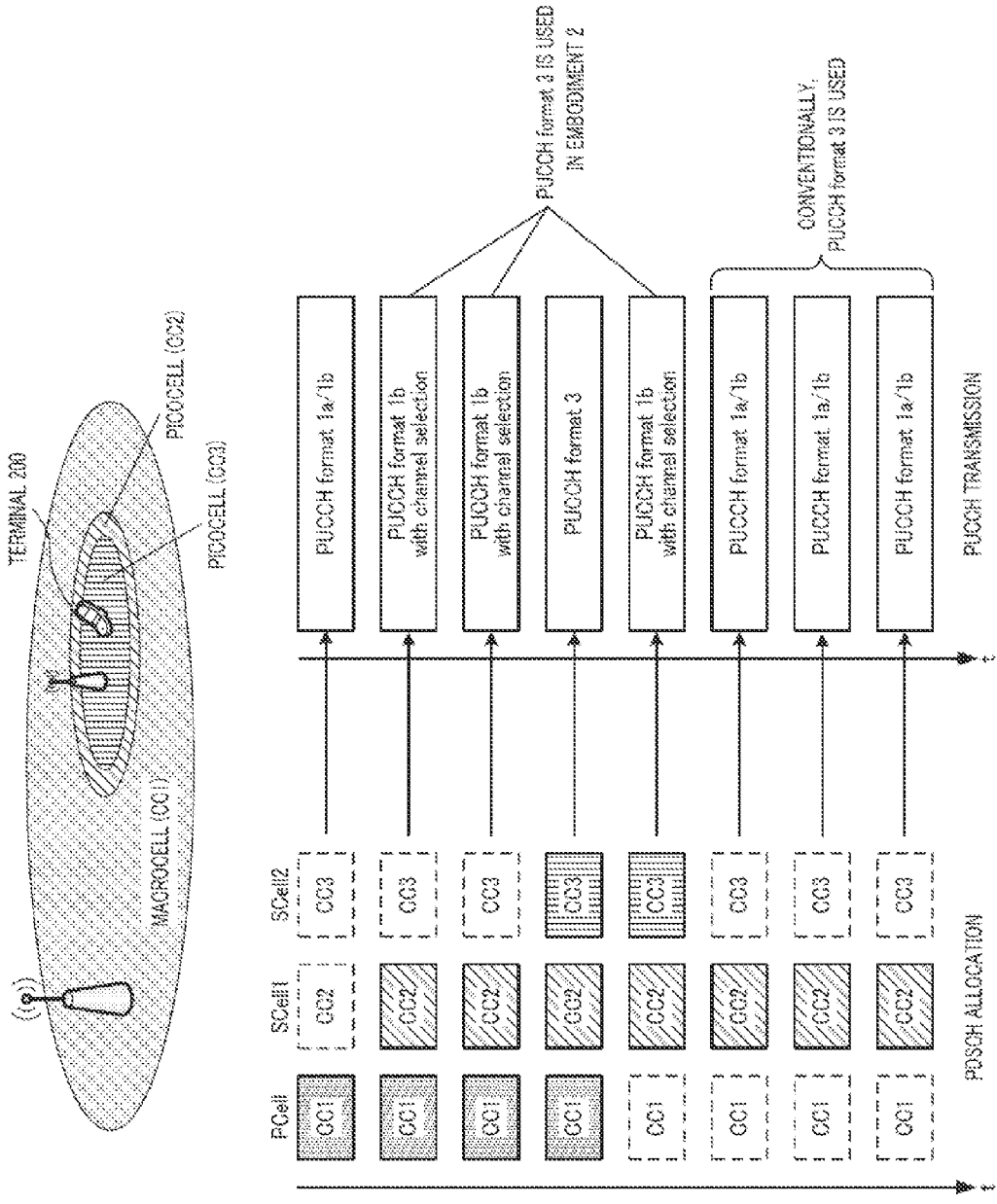
FIGS. 14A and 14B illustrate an example of allocation of A/N resources according to Embodiment 3 of the present invention.

FIG. 14A illustrates a communication system in a HetNet/CoMP environment in which CA with three CCs is configured. FIG. 14A is identical to FIG. 11A and FIG. 13A. FIG. 14B illustrates an example of PUCCH (A/N signal) transmission corresponding to PDSCH (downlink data) allocation and PDSCH allocation according to the present embodiment.

According to Embodiment 1 (FIG. 11B) and Embodiment 2 (FIG. 13B) (or conventional method (not shown)), when PUCCH format 3 is configured for a terminal, even when downlink data is allocated using only two CCs at a certain timing, A/N signals in response to the downlink data are transmitted using PUCCH format 3.

In contrast, in the present embodiment, even when PUCCH format 3 is configured for terminal 200 as shown in FIG. 14B, if downlink data is allocated using only two CCs at a certain timing, terminal 200 can transmit A/N signals in response to the downlink data using PUCCH format 1b with channel selection.

As described above, although PUCCH format 1b with channel selection uses a plurality of A/N resources, it has higher resource utilization efficiency of PUCCH for A/N signals of downlink data with two CCs than PUCCH format 3. Therefore, according to the present embodiment, it is possible to further improve PUCCH utilization efficiency compared to Embodiment 2 by using a more suitable PUCCH format in accordance with the number of CCs to which downlink data is allocated irrespective of the number of CCs of CA configured for terminal 200.

Figure 15:
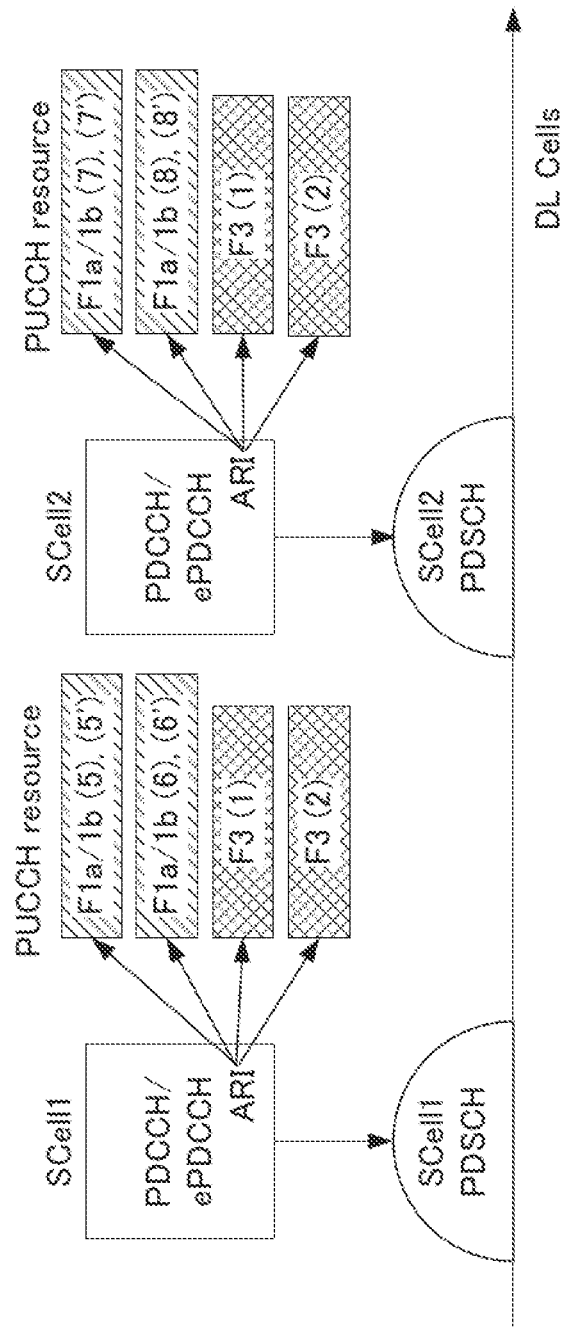
FIG. 15 illustrates another example of allocation of A/N resources according to Embodiment 3 of the present invention.

A case has been described in the present embodiment where one A/N resource of PUCCH formats 1a/1b is associated with each value that can be taken by an ARI (four values in the case of 2 bits). However, two A/N resources of PUCCH formats 1a/1b may also be associated with each value that can be taken by an ARI. For example, as shown in FIG. 15, a set of two A/N resources of PUCCH formats 1a/1b or A/N resources of PUCCH format 3 are associated with respective values (four values in FIG. 15) that can be taken by each ARI. In this case, two different A/N resources of PUCCH formats 1a/1b are previously indicated for each value of ARI as A/N resources of PUCCH formats 1a/1b using RRC control information or the like. Thus, four A/N resources are indicated by two ARIs included in each piece of control information with two CCs, which specify different values.

Thus, for example, when two codewords (CW) are transmitted/received with each of two CCs, that is, when A/N signals of a maximum of 4 bits are fed back, the present embodiment can be applied. An example of the case where two codewords are transmitted/received with each CC is MIMO (Multiple Input Multiple Output) transmission.

In the present embodiment, even when downlink data is allocated using only two CCs, base station 100 (network) may specify A/N resources of PUCCH format 3 using an ARI. Thus, for example, even when many terminals 200 are transmitting A/N signals using PUCCH form a 1a/1b and there are no more available A/N resources, A/N resources of PUCCH format 3 are available, and it is possible to thereby prevent collision of A/N resources among terminals 200.

The present embodiment has described an A/N resource allocation method whereby downlink data is allocated using only two CCs when three CCs (or three or more CCs) are configured for terminal 200. However, without being limited to this, the A/N resource allocation method of the present embodiment may be applied to a case where CA using a maximum of two CCs is configured for terminal 200. That is, when control information of PCell is received using PDCCH, terminal 200 performs channel selection using A/N resources determined by a CCE index of control information of the PDCCH and equation 1, and A/N resources determined by an ARI included in control information of SCell. On the other hand, when control information of PCell is received using ePDCCH, terminal 200 performs channel selection using different A/N resources of PUCCH formats 1a/1b indicated by two ARIs. Thus, even when CA using two CCs is configured, terminal 200 can always feed back A/N signals using PUCCH format 1b with channel selection regardless of by which of PDCCH or ePDCCH the control information is received. In this case, it is only necessary to follow conventional rules as channel selection and no additional mechanism is required, preventing the circuit scale from increasing.

The embodiments of the present invention have been described thus far.

In the foregoing embodiments, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A base station apparatus according to the embodiments described above is configured to transmit downlink data to a terminal apparatus using a plurality of component carriers (CCs) including one first CC and one or a plurality of second CCs, the base station apparatus including: a control section that generates an index indicating a response signal resource to be used for transmission of a response signal in response to the downlink data of the plurality of CCs for at least each of the second CCs; and a transmitting section that transmits control information including the index, in which: when the terminal apparatus receives the control information using only one second CC or two or more CCs among the plurality of CCs, the terminal apparatus determines the response signal resource based on the index of the second CC; and the control section specifies a first resource or a second resource as the response signal resource using the index of the second CC, the first resource being a resource for transmission of a response signal in response to downlink data transmitted using only one CC, the second resource being a resource for transmission of a plurality of response signals in response to downlink data transmitted using a plurality of CCs.

In the base station apparatus according to the embodiments, when control information of the first CC is transmitted via a control channel arranged in a data channel region, the control section generates the index of the first CC and specifies the first resource or the second resource as the response signal resource using the index of the first CC.

In the base station apparatus according to the embodiments: when downlink data is transmitted using only the first CC, the control section specifies one of a plurality of the first resources using the index of the first CC; and when downlink data is transmitted using the plurality of CCs, the control section specifies, using the index of the first CC, a resource identical to the resource indicated by the index of the second CC among a plurality of the second resources.

In the base station apparatus according to the embodiments: when transmitting downlink data to the terminal apparatus using one second CC among the plurality of CCs, the control section specifies the first resource using the index of the one second CC; and when transmitting downlink data to the terminal apparatus using two or more CCs among the plurality of CCs, the control section specifies the second resource using the index of the second CC.

In the base station apparatus according to the embodiments, when downlink data is transmitted using only two CCs of the plurality of CCs, the control section specifies the first resources different from each other using the indexes of the two CCs, respectively.

In the base station apparatus according to the embodiments: a set of the first resources, or the second resource is associated with each value used for the index; and when downlink data is transmitted using only two CCs of the plurality of CCs, the control section specifies different sets of the first resources using the indexes of the two CCs, respectively.

In the base station apparatus according to the embodiments, the index of each of the plurality of second CCs indicates one resource of the plurality of different first resources among the plurality of second CCs and the plurality of identical second resources among the plurality of second CCs.

In the base station apparatus according to the embodiments, the first resource and the second resource are resources in the first CC.

A terminal apparatus according to the embodiments described above includes: a receiving section that receives downlink data and control information transmitted from a base station apparatus using a plurality of component carriers (CCs) including one first CC and one or a plurality of second CCs; a control section that determines, when the control information is received using only one second CC or two or more CCs among the plurality of CCs, a response signal resource to be used for transmission of a response signal in response to downlink data based on an index included in the control information of the second CC; and a transmitting section that transmits the response signal using the determined response signal resource, in which the response signal resource determined based on the index of the second CC is a first resource for transmission of a response signal in response to the downlink data transmitted using only one CC or a second resource for transmission of a plurality of response signals in response to downlink data transmitted using a plurality of CCs.

A resource allocation method according to the embodiments described above is a method for a base station apparatus that transmits downlink data to a terminal apparatus using a plurality of component carriers (CCs) including one first CC and one or a plurality of second CCs, the method including: generating an index indicating a response signal resource to be used for transmission of a response signal in response to the downlink data of the plurality of CCs for at least each of the second CCs; transmitting control information including the index; determining by the terminal apparatus, when the terminal apparatus receives the control information using only one second CC or two or more CCs among the plurality of CCs, the response signal resource based on the index of the second CC; and specifying a first resource or a second resource using the index of the second CC as the response signal resource, the first resource being a resource for transmission of a response signal in response to downlink data transmitted by only one CC, the second resource being a resource for transmission of a plurality of response signals in response to downlink data transmitted using a plurality of CCs.

A response signal transmission method according to the embodiments described above includes: receiving downlink data and control information transmitted from a base station apparatus using a plurality of component carriers (CCs) including one first CC and one or a plurality of second CCs; determining, when the control information is received using only one second CC or two or more CCs among the plurality of CCs, a response signal resource to be used for transmission of a response signal in response to the downlink data based on an index included in the control information of the second CC; and transmitting the response signal using the determined response signal resource, in which the response signal resource determined based on the index of the second CC is a first resource for transmission of a response signal in response to downlink data transmitted using only one CC or a second resource for transmission of a plurality of response signals in response to downlink data transmitted using a plurality of CCs.

The disclosure of the specification, drawings, and abstract included in Japanese Patent Application No. 2012-172221, filed on Aug. 2, 2012 is incorporated herein by reference in its entirety.

INDUSTRIAL APPLICABILITY

The present invention is useful in mobile communication systems, for example.

REFERENCE SIGNS LIST

100 Base station
200 Terminal
101 Control information generating section
102, 104 Coding section
103, 106 Modulation section
105 Retransmission control section
107 Subframe configuration section
108 IFFT section
109 CP adding section
110, 217 Radio transmitting section
111, 201 Antenna
112, 202 Radio receiving section 113, 203 CP removing section
114 A/N signal extracting section
115, 208, 212 Determining section
150, 209, 260 Control section
160, 270 Transmitting section
204 FFT section
205 Extraction section
206, 210 Demodulation section
207, 211 Decoding section
213 A/N signal modulation section
214 PUCCH generating section
215 Reference signal generating section
216 Multiplexing section
250 Receiving section

The invention claimed is:

1. A base station apparatus configured to transmit downlink data to a terminal apparatus using a plurality of component carriers (CCs) including one first CC and one or a plurality of second CCs, the base station apparatus comprising:
 a control section that generates an index indicating a response signal resource to be used for transmission of a response signal in response to the downlink data of the plurality of CCs for at least each of the second CCs; and
 a transmitting section that transmits control information including the index, wherein:
 when the terminal apparatus receives the control information using only one second CC or two or more CCs among the plurality of CCs, the terminal apparatus determines the response signal resource based on the index of the second CC; and
 the control section specifies a first resource or a second resource as the response signal resource using the index of the second CC, the first resource being a resource for transmission of a response signal in response to downlink data transmitted using only one CC, the second resource being a resource for transmission of a plurality of response signals in response to downlink data transmitted using a plurality of CCs.

2. The base station apparatus according to claim 1, wherein, when control information of the first CC is transmitted via a control channel arranged in a data channel region, the control section generates the index of the first CC and specifies the first resource or the second resource as the response signal resource using the index of the first CC.

3. The base station apparatus according to claim 2, wherein:
 when downlink data is transmitted using only the first CC, the control section specifies one of a plurality of the first resources using the index of the first CC; and
 when downlink data is transmitted using the plurality of CCs, the control section specifies, using the index of the first CC, a resource identical to the resource indicated by the index of the second CC among a plurality of the second resources.

4. The base station apparatus according to claim 1, wherein:
 when transmitting downlink data to the terminal apparatus using one second CC among the plurality of CCs, the control section specifies the first resource using the index of the one second CC; and
 when transmitting downlink data to the terminal apparatus using two or more CCs among the plurality of CCs, the control section specifies the second resource using the index of the second CC.

5. The base station apparatus according to claim 2, wherein, when downlink data is transmitted using only two CCs of the plurality of CCs, the control section specifies the first resources different from each other using the indexes of the two CCs, respectively.

6. The base station apparatus according to claim 2, wherein:
 a set of the first resources, or the second resource is associated with each value used for the index; and
 when downlink data is transmitted using only two CCs of the plurality of CCs, the control section specifies different sets of the first resources using the indexes of the two CCs, respectively.

7. The base station apparatus according to claim 1, wherein the index of each of the plurality of second CCs indicates one resource of the plurality of different first resources among the plurality of second CCs and the plurality of identical second resources among the plurality of second CCs.

8. The base station apparatus according to claim 1, wherein the first resource and the second resource are resources in the first CC.

9. A terminal apparatus comprising:
 a receiving section that receives downlink data and control information transmitted from a base station apparatus using a plurality of component carriers (CCs) including one first CC and one or a plurality of second CCs;
 a control section that determines, when the control information is received using only one second CC or two or more CCs among the plurality of CCs, a response signal resource to be used for transmission of a response signal in response to the downlink data based on an index included in the control information of the second CC; and
 a transmitting section that transmits the response signal using the determined response signal resource, wherein the response signal resource determined based on the index of the second CC is a first resource for transmission of a response signal in response to downlink data transmitted using only one CC or a second resource for transmission of a plurality of response signals in response to downlink data transmitted using a plurality of CCs.

10. A resource allocation method for a base station apparatus that transmits downlink data to a terminal apparatus using a plurality of component carriers (CCs) including one first CC and one or a plurality of second CCs, the resource allocation method comprising:
 generating an index indicating a response signal resource to be used for transmission of a response signal in response to the downlink data of the plurality of CCs for at least each of the second CCs;
 transmitting control information including the index;
 determining by the terminal apparatus, when the terminal apparatus receives the control information using only one second CC or two or more CCs among the plurality of CCs, the response signal resource based on the index of the second CC; and
 specifying a first resource or a second resource using the index of the second CC as the response signal resource, the first resource being a resource for transmission of a response signal in response to downlink data transmitted by only one CC, the second resource being a resource for transmission of a plurality of response signals in response to downlink data transmitted using a plurality of CCs.

11. A response signal transmission method comprising:
 receiving downlink data and control information transmitted from a base station apparatus using a plurality of component carriers (CCs) including one first CC and one or a plurality of second CCs;

determining, when the control information is received using only one second CC or two or more CCs among the plurality of CCs, a response signal resource to be used for transmission of a response signal in response to the downlink data based on an index included in the control information of the second CC; and transmitting the response signal using the determined response signal resource, wherein the response signal resource determined based on the index of the second CC is a first resource for transmission of a response signal in response to downlink data transmitted using only one CC or a second resource for transmission of a plurality of response signals in response to downlink data transmitted using a plurality of CCs.

* * * * *